US011392535B2

(12) United States Patent
Ross et al.

(10) Patent No.: US 11,392,535 B2
(45) Date of Patent: Jul. 19, 2022

(54) LOADING OPERANDS AND OUTPUTTING RESULTS FROM A MULTI-DIMENSIONAL ARRAY USING ONLY A SINGLE SIDE

(71) Applicant: Groq, Inc., Mountain View, CA (US)

(72) Inventors: Jonathan Alexander Ross, Palo Alto, CA (US); Tom Hawkins, Bellingham, WA (US); Dennis Charles Abts, Eau Claire, WI (US)

(73) Assignee: GROQ, INC., Mountain View, CA (US)

( * ) Notice: Subject to any disclaimer, the term of this patent is extended or adjusted under 35 U.S.C. 154(b) by 0 days.

(21) Appl. No.: 17/104,465

(22) Filed: Nov. 25, 2020

(65) Prior Publication Data
US 2021/0157767 A1 May 27, 2021

Related U.S. Application Data

(60) Provisional application No. 62/940,818, filed on Nov. 26, 2019.

(51) Int. Cl.
*G06F 15/80* (2006.01)
*G06F 9/30* (2018.01)
*G06F 9/38* (2018.01)
*G06N 3/063* (2006.01)

(52) U.S. Cl.
CPC ...... *G06F 15/8046* (2013.01); *G06F 9/30098* (2013.01); *G06F 9/3885* (2013.01); *G06F 15/80* (2013.01); *G06N 3/063* (2013.01)

(58) Field of Classification Search
CPC .. G06F 15/8046; G06F 15/80; G06F 15/8023; G06F 9/00–3897; G06F 15/00–825; G06N 3/04
USPC .......................................................... 712/19
See application file for complete search history.

(56) References Cited

U.S. PATENT DOCUMENTS

| 5,058,001 A | 10/1991 | Li |
| 5,333,279 A | 7/1994 | Dunning |
| 5,590,083 A | 12/1996 | Pinkham et al. |
| 5,842,034 A | 11/1998 | Bolstad et al. |

(Continued)

OTHER PUBLICATIONS

D. Abts et al., "Think Fast: A Tensor Streaming Processor (TSP) for Accelerating Deep Learning Workloads," 2020 ACM/IEEE 47th Annual International Symposium on Computer Architecture (ISCA), May 2020, pp. 145-158 (Year: 2020).*

(Continued)

*Primary Examiner* — Keith E Vicary
(74) *Attorney, Agent, or Firm* — Fenwick & West LLP

(57) ABSTRACT

A computational array is implemented in which all operands and results are loaded or output from a single side of the array. The computational array comprises a plurality of cells arranged in n rows and m columns, each configured to produce a processed value based upon a weight value and an activation value. The cells receive weight and activation values via colinear weight and activation transmission channels that each extend across a first side edge of the computational array to provide weight values and activation values to the cells of the array. In addition, result values produced at a top cell of each of the m columns of the array are routed through the array to be output from the same first side edge of the array at a same relative timing at which the result values were produced.

20 Claims, 16 Drawing Sheets

(56) References Cited

U.S. PATENT DOCUMENTS

| | | | |
|---|---|---|---|
| 6,298,162 | B1 | 10/2001 | Sutha et al. |
| 7,236,995 | B2 | 6/2007 | Hinds |
| 9,146,747 | B2 | 9/2015 | Moloney et al. |
| 9,691,019 | B1 | 6/2017 | Gulland et al. |
| 9,697,463 | B2 | 7/2017 | Ross et al. |
| 9,710,748 | B2 | 7/2017 | Ross et al. |
| 10,167,800 | B1 | 1/2019 | Chung et al. |
| 10,521,488 | B1 * | 12/2019 | Ross ............... G06F 17/16 |
| 11,086,623 | B2 | 8/2021 | Valentine et al. |
| 2004/0078555 | A1 | 4/2004 | Porten et al. |
| 2005/0278505 | A1 | 12/2005 | Lim et al. |
| 2012/0072699 | A1 | 3/2012 | Vorbach et al. |
| 2012/0159507 | A1 | 6/2012 | Kwon et al. |
| 2012/0303933 | A1 | 11/2012 | Manet et al. |
| 2012/0317065 | A1 | 12/2012 | Bernstein et al. |
| 2014/0047211 | A1 | 2/2014 | Fleischer et al. |
| 2014/0115301 | A1 | 4/2014 | Sanghai et al. |
| 2016/0342892 | A1 * | 11/2016 | Ross ............... G06N 3/063 |
| 2017/0103316 | A1 | 4/2017 | Ross et al. |
| 2017/0139677 | A1 | 5/2017 | Lutz et al. |
| 2017/0177352 | A1 | 6/2017 | Ould-Ahmed-Vall |
| 2017/0220719 | A1 | 8/2017 | Elrabaa et al. |
| 2018/0075338 | A1 | 3/2018 | Gokmen |
| 2018/0121796 | A1 * | 5/2018 | Deisher ............. G06N 3/0472 |
| 2018/0247190 | A1 | 8/2018 | Chung et al. |
| 2018/0314671 | A1 * | 11/2018 | Zhang ............. G06F 15/8046 |
| 2018/0315157 | A1 | 11/2018 | Ould-Ahmed-Vall et al. |
| 2018/0329479 | A1 | 11/2018 | Meixner |
| 2019/0311243 | A1 * | 10/2019 | Whatmough ........ G06N 3/0454 |
| 2019/0370645 | A1 | 12/2019 | Lee et al. |
| 2020/0192701 | A1 * | 6/2020 | Horowitz ............ G06N 3/08 |
| 2020/0285605 | A1 * | 9/2020 | Nam ............... G06F 9/3001 |

OTHER PUBLICATIONS

Southard, D. "Tensor Streaming Architecture Delivers Unmatched Performance for Compute-Intensive Workloads" Groq White Paper. 2019. 7 pages. (Year: 2019).*

Groq, Inc. "The Challenge of Batch Size 1: Groq Adds Responsiveness to Inference Performance" White Paper. 2020. 7 pages. (Year: 2020).*

Jouppi, N.P. et al., "In-Datacenter Performance Analysis of a Tensor Processing Unit," ISCA '17, Jun. 2017, pp. 1-12.

Groq, "Groq Announces World's First Architecture Capable of 1,000,000,000,000,000 Operations per Second on a Single Chip," Nov. 14, 2019, three pages, [Online] [Retrieved on Jan. 12, 2021] Retrieved from the Internet <URL: https://www.prnewswire.com/news-releases/groq-announces-worlds-first-architecture-capable-of-1-000-000-000-000-000-operations-per-second-on-a-single-chip-300958743.html>.

United States Office Action, U.S. Appl. No. 16/132,243, dated Aug. 10, 2020, 20 pages.

United States Office Action, U.S. Appl. No. 16/132,243, dated Dec. 31, 2019, 15 pages.

Wang, X. et al., "HERA: A Reconfigurable and Mixed-Mode Parallel Computing Engine on Platform FPGAS," Jan. 2004, pp. 1-6.

PCT International Search Report and Written Opinion, PCT Application No. PCT/US20/62241, dated Feb. 11, 2021, 20 pages.

United States Office Action, U.S. Appl. No. 17/105,976, dated Sep. 30, 2021, 18 pages.

* cited by examiner

LOADING OPERANDS AND OUTPUTTING RESULTS FROM A MULTI-DIMENSIONAL ARRAY USING ONLY A SINGLE SIDE

CROSS-REFERENCE TO RELATED APPLICATIONS

This application claims priority under 35 U.S.C. § 119(e) to U.S. Provisional App. No. 62/940,818, filed on Nov. 26, 2019, which is hereby incorporated by reference in its entirety.

BACKGROUND

This disclosure relates generally to computational arrays, and more specifically to routing of inputs and outputs of computational arrays.

In many computational arrays, operands and outputs are loaded and output from different sides of the computational array. For example, in many systolic array designs, different operands (e.g., weights and activations) are loaded via two different sides of the array, while generated result values are output from a third side of the array. However, loading inputs and receiving results via multiple sides of the computational array may limit the size of the computational array relative to the memory and controller circuitry for operating the computational array, and may increase the length and complexity of wiring needed to route the various inputs and outputs of the computational array.

SUMMARY

A computational array is implemented in which all operands and results are loaded or output from a single side of the array. The computational array comprises a plurality of cells arranged in n rows and m columns, each configured to produce a processed value based upon a weight value and an activation value. The cells receive weight and activation values are received via colinear weight and activation transmission channels that each extend across a first side edge of the computational array to provide weight values and activations values to the cells of the array. In addition, result values produced at a top cell of each of the m columns of the array are routed through the array to be output from the same first side edge of the array at a same relative timing at which the result values were produced.

In accordance with some embodiments, a system is provided that comprises a computational array comprising a plurality of cells arranged in n rows and m columns, each configured to produce a processed value based upon a weight value and an activation value. The system further comprises at least two colinear transmission channels corresponding to at least a weights transmission channel and an activations transmission channel. The weights transmission channel and the activations transmission channel each extend across a first side edge of the computational array to provide weight values and activations values to the cells of the computational array.

In some embodiments, the computational array is configured to generate a plurality of results values based upon the processed values produced by each cell. In some embodiments, the at least two colinear transmission channels further comprises a result output channel that extends across the first side edge of the computational array that outputs the plurality of results values generated by the computational array.

In some embodiments, the computational array is configured to generate, at an end cell of each of the m columns of the computational array, a result value of the plurality of result values corresponding to an aggregation of processed values generated by the cells of the respective column of the computational array, and to output the generated m result values from the first side of the computational array via the results output channel.

In some embodiments, the computational array is configured to output the generated m results from the first side of the computational array using routing circuits implemented in each of at least a portion of the cells of the array. In some embodiments, the routing circuits are configured to propagate each of the m results along the respective column by a number of cell until reaching a cell within the respective column that is along a diagonal of the computational array, and to propagate each of the m results across m rows of the computational array from the respective cell along the diagonal of the computational array, such that each of the m results are output from the computational array from the first side of the computational array, with a same relative timing at which the m results were produced.

BRIEF DESCRIPTION OF THE DRAWINGS

Figure (FIG. 1 illustrates a computational array comprising an array of multiply-accumulate cells (MACC cells) in which operands are loaded from three different sides.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A purpose-built 2D matrix functional unit (hereinafter referred to as a computational array) described herein loads its operands and generates results entirely from only one dimension (1D) (e.g. the left-side) of the unit. A computational array may correspond to a systolic array used for matrix multiplication, performing convolution operations, and/or the like. In some embodiments, a computational array is used to implement a machine learning model.

Figure 1:
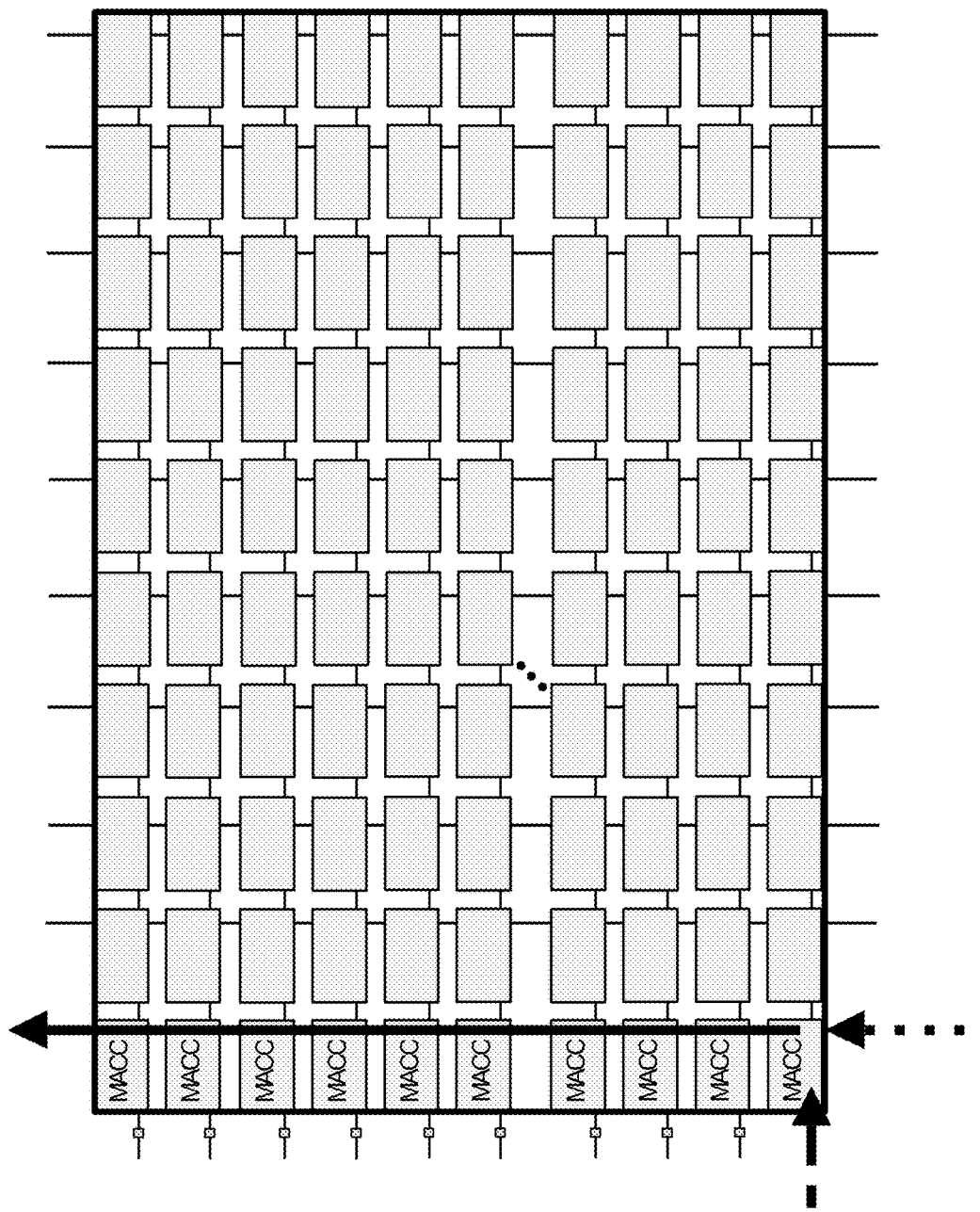

Most computational array designs use three sides of the array to load the operands (weights and activations) and output generated results (new activations). For example, many systolic array designs load the array with weights and activations coming from the bottom or top and left side of the array, respectively, and the results output from the top or bottom of the array. For example, FIG. 1 illustrates a computational array comprising an array of multiply-accumulate cells (MACC cells) in which operands are loaded into the array from three different sides. As illustrated in FIG. 1, activation values are loaded from a left side of the array, weight values are loaded from a bottom side of the array, and results are propagated through each column of the array to be output from the top side of the array.

Figure 2A:
FIG. 2A illustrates a two-dimensional (2D) computational array in which operands (e.g., weights and activations) and results are loaded/output from different sides.

When operands and results are loaded and output from different sides of a computational array, additional circuitry along the different sides of the array is required in order to load and receive the operands and results, potentially restricting the ability to scale the size of the array. FIG. 2A illustrates a 2D computational array in which operands (e.g., weights and activations) and results are loaded/output from different sides. The computational array of FIG. 2A may load operands and output results in a manner similar to that illustrated in FIG. 1. As illustrated in FIG. 2A, growth of the multidimensional array implies quadratic shrinking in the areas surrounding the array (e.g., comprising circuitry feeding operands to the array). This erosion precludes scaling in only a single direction.

Figure 2B:
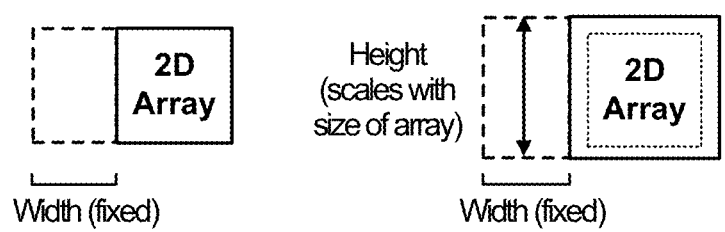
FIG. 2B illustrates a 2D computational array in which operands and results are loaded/output from a single side, in accordance with some embodiments.

On the other hand, by loading all operands from one side, straightforward linear scaling of architecture can be achieved. FIG. 2B illustrates a 2D computational array in which operands and results are loaded/output from a single side (e.g., the left side of the array). By loading/output from only a single side, the quadratic scaling limitation is removed. For example, the width of the adjacent circuitry (comprising the memory, preprocessor, etc.) can be fixed, with only the height being scaled to match that of the computational array due to not having to accommodate changes in both dimensions of the computational array.

Using the techniques presented herein, a design for a 2D computational array is implemented in which all operands and results are loaded or output from a single side of the array. Advantages of single sided loading include scalability of the array. As the size of the computational array (e.g., number of MACCs in the array) increases, so does the operand requirements to feed it. Thus, as the array grows $O(n^2)$, each edge of the array grows by $O(n)$.

Figure 3A:
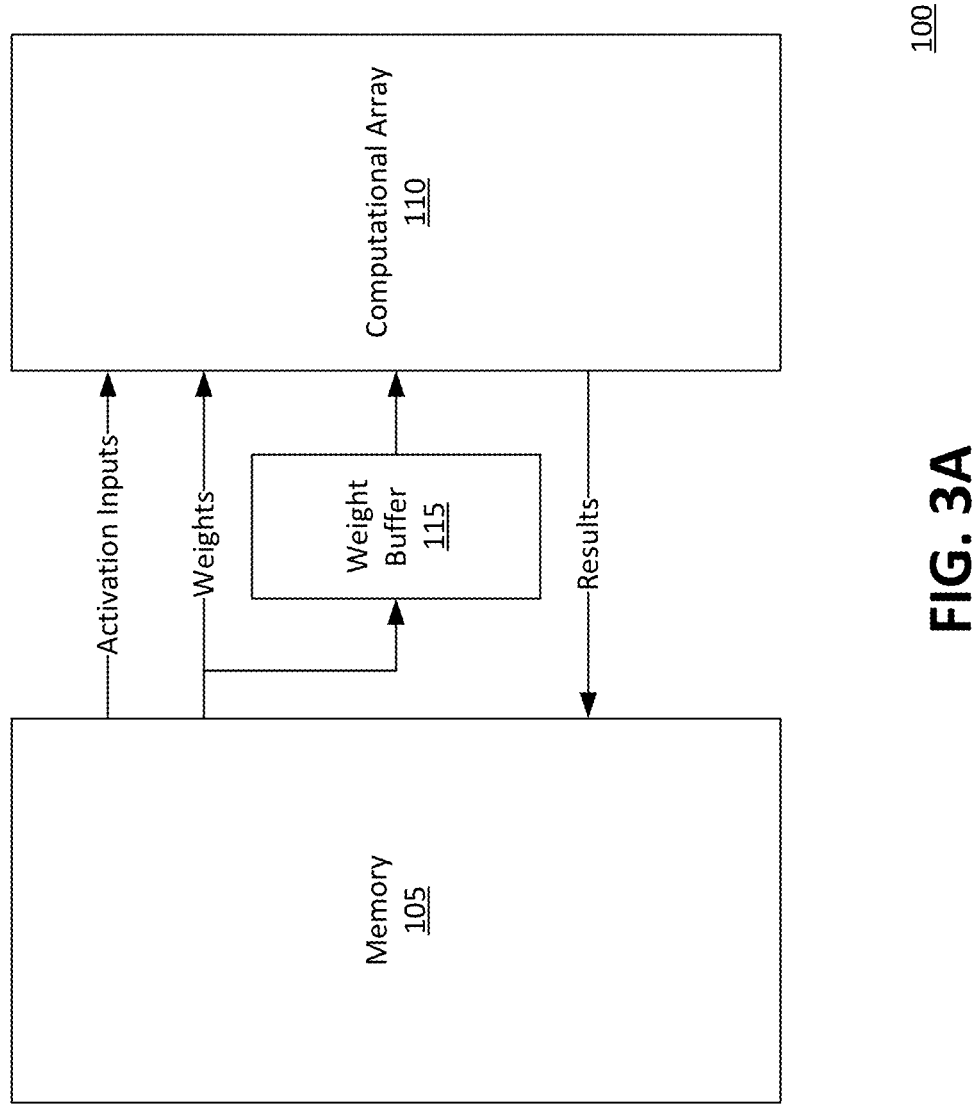
FIG. 3A illustrates top-level chip macro-architecture containing a computational array, in accordance with some embodiments.

FIG. 3A illustrates top-level chip macro-architecture containing a computational array, in accordance with some embodiments. The macro-architecture 100 comprises a memory 105 that stores activation inputs and weights to be used by a computational array 110 to generate result values. As illustrated in FIG. 3A, the computational array 110 receives the activation and weight values from the memory 105 through a first side of the computational array 110 (illustrated as the left side in FIG. 3A) via one or more activation transmission lines and one or more weights transmission lines. In addition, the computational array 110 outputs result values (e.g., to be stored within the memory 105) through the first side to the memory 105 via one or more results transmission lines. In some embodiments, the received result values stored in the memory 105 may be used to determine activation values to be loaded onto the computational array 110 for future computations.

In some embodiments, the computational array 110 is matrix multiplication unit (MXM) comprising an array of multiply-accumulate (MACC) cells. In other embodiments, the computational array 110 is a convolutional array for performing convolution operations, or other type of array.

In some embodiments, the weights from the memory 105 may be temporarily stored in a weight buffer 115 prior to being loaded into the computational array. The weight buffer 115 is described in greater detail below. In some embodiments, the weight buffer 115 may be bypassed, such that weight values from the memory 105 are loaded directly onto the computational array 110 via the weights transmission lines, as will be discussed below.

Figure 3B:
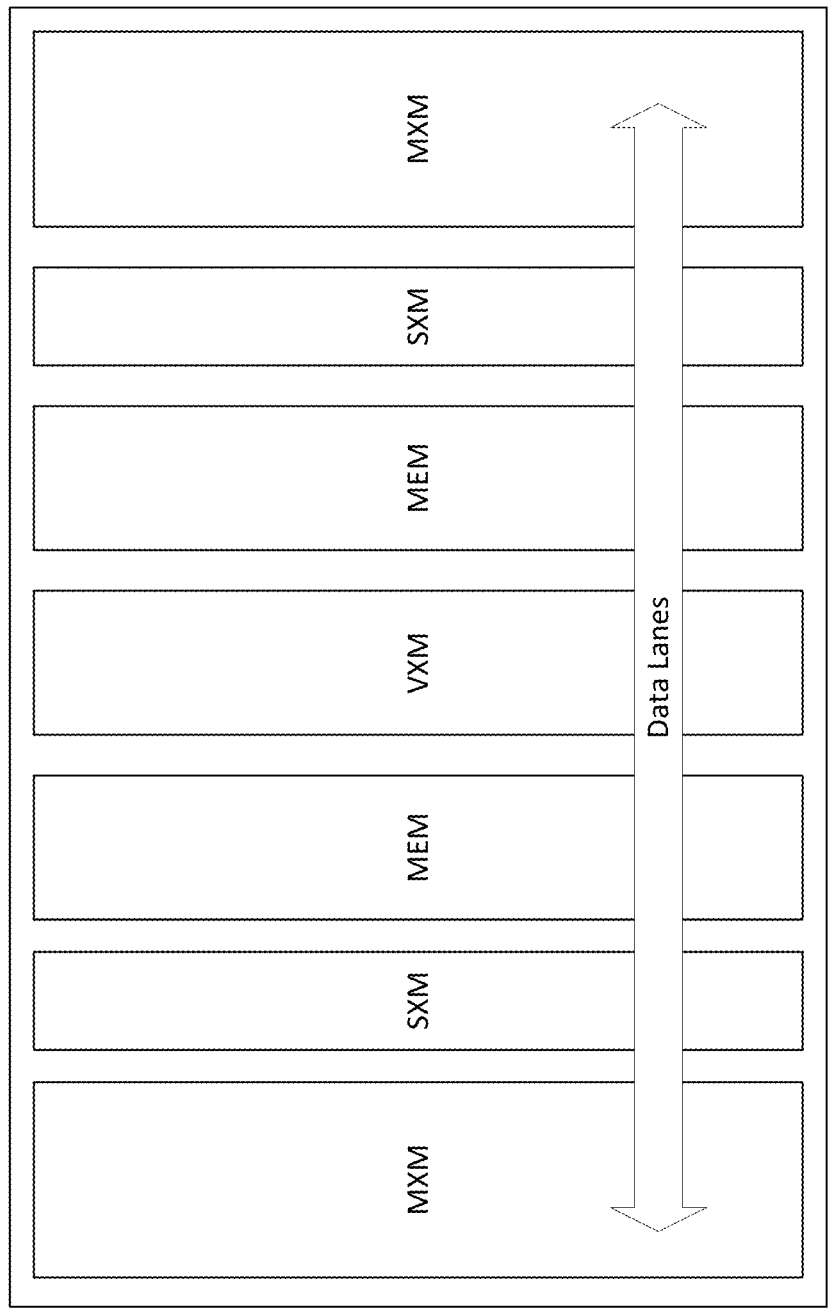
FIG. 3B illustrates a high-level diagram of a processor containing a memory and a computational array, in accordance with some embodiments.

Although FIG. 3A illustrates the computational array 110 as located adjacent to the memory 105, it is understood that in some embodiments, the computational array 110 may be separated from the memory 105 by additional components. For example, FIG. 3B illustrates a high-level diagram of a processor containing a memory and a computational array, in accordance with some embodiments. The processor may be a tensor streaming processor (TSP), and organized into a plurality of functional regions or units, each configured to perform specific functions on received data. These may include memory units (MEM) configured to store data, vector execution module (VXM) units comprising arithmetic logic units (ALUs) configured to perform point-wise arithmetic or logical operations on received data, MXM units comprising an array of MACC cells for performing matrix multiplication, and switch execution module (SXM) units for allowing for movement of data between different lanes that cross the processor. The memory 105 may correspond to a MEM unit, while the computational array 110 may correspond to an MXM unit illustrated in FIG. 3B.

In the processor illustrated in FIG. 3B, data operands (including weights and activation values to be used by the computational array, as well as result values output from the computational array) are transmitted across the functional regions of the processor via data lanes that extend along a first dimension (e.g., horizontally in either direction as shown in FIG. 3B), allowing for data to be transmitted across the functional regions of the processor. For example, in some embodiments, each functional unit contains an array of cells or tiles. For example, the MEM unit may comprise an array of memory cells, while the VXM unit and MXM units comprise arrays of ALUs and MACC cells, respectively. The cells of each functional region of the processor are organized into a plurality of rows, where the cells of each row are connected by a respective data lane comprising a plurality of wires connecting adjacent cells of the row. Cells of each functional region of the processor may receive data operands via a data lane, perform one or more operations on the received data operands, and output resulting data onto the data lane for transmission to cells of subsequent functional regions. For example, in some embodiments, a data operand may be read from a memory cell of the MEM unit, transmitted along a data lane (e.g., corresponding to the row of the memory cell) to be processed by an ALU cell of the VXM unit, and then transmitted to a MACC cell of the computational array (e.g., MXM unit) for use matrix multiplication, the results of which may be transmitted back to a cell of the MEM unit for storage, or to a cell of another functional unit for further processing. In addition, a cell of a functional region may receive a data operand via a data lane and pass through the data operand without additional processing (e.g., a data operand read from a memory cell of the MEM unit and transmitted across a data lane through the ALU cells of the VXM without being processed, to be processed at an MXM for use in matrix multiplication).

Although FIG. 3B illustrates the various regions of the processor arranged in a particular order, it is understood that in other embodiments, the various units of the processor may be arranged differently.

Being able to load weight and activation values, and output result values, from a single side of a computational array allows for all data operands transmitted between the memory and computational array (and/or other functional units on the processor chip) to be transmitted along data lanes extending along a single dimension. In some embodiments, each cell of the functional units is adjacent to (or abuts) other cells in their row, and data is transmitted by connecting abutting cells of each row to form a colinear data lane for the row. This allows for an increased amount of data to be transmitted across the functional units of the processor, due to the colinear wiring scheme connecting abutting cells and reducing congestion.

For example, the number of signals internal to a functional unit, and between functional units, is limited by the "pitch" (distance between a pair of wires) which determines the wire density (e.g., wires/mm) that can be exploited. For example, on a chip with a 50 nm pitch, there can be a maximum of 20K wires per mm, or, since using every single available wire is generally not possible, 10K per mm assuming 50% utilization of the available wire space. In some embodiments, each cell of the processor may be approximately 1 mm high, allowing for up to about 10K signals across each row of cells. In some embodiments, a single data lane may have: (2 directions)×(138 bits per stream)×32 streams=8,832 wires which is <10K/mm as computed above. In a processor chip having 20 rows, this allows for (20 data lanes)×(8,832 wires per data lane)=176,640 wires, for an on-chip network capacity of 160 TB/s operating at 900 MHz.

However, routing congestion will consume wire resources in order to connect components that are not abutted. Thus an abutted design style allows a collinear data flow and minimizes wire congestion, allowing for the available underlying ASIC wire density to be utilized more efficiently (e.g., to achieve the wire density described above), and minimizes the total wire length. For example, the computational array/MXM is configured to receive operand inputs and to output result values from the same side of the array (e.g., eastward flowing streams carry operands from memory to the MXM and westward flowing streams carry results from the MXM back to the memory), allowing for the computational array to be connected to other functional regions of the processor (e.g., the memory) via parallel wires that do not need to turn corners. However, if the results were produced in the opposite direction (i.e., if operands and results were received/output on different sides of the MXM), the signals would need to be routed orthogonally to get the results back to the desired memory unit for storage. If datapaths have to "turn corners" and be routed orthogonally, it consumes additional wire resources, eroding the usable wires for the data path. To avoid this, the on-chip network uses bidirectional stream registers (eastward and westward) to shuttle operands and results across each lane (e.g., to allow the MXM to receive operands and transmit results via the data lanes of each row across the same side of the MXM). Other embodiments for an on-chip network may include a ring or torus, for example, to interconnect the cells of the functional regions and use the available wire density on the ASIC while minimizing a need to turn corners and cause wire congestion. In some embodiments (e.g., as illustrated in FIG. 3B), functional units within each data lane are organized to interleave functional units (e.g., MXM-MEM-VXM-MEM-MXM) to take advantage of this data flow locality between the functional units. This on-chip wire density is dramatically more than the available off-chip pin bandwidth for communicating between TSPs.

Computational Array Cell Structure

In some embodiments, as discussed above, the computational array comprises an array of cells (e.g., n rows by m columns). Each cell may correspond to a basic computation primitive, such as a MACC function. Each cell may take up to three inputs, and produce a single output. The inputs of a cell may comprise an input bias/offset or sub-result that represents a partial result input from an adjacent cell (if any), input weights/parameters (e.g., weights determined during a training process, or, if the computational array is being used for training, representing some initial weights which will be updated during stochastic gradient descent (SGD) forward and backward propagation phases or other training techniques), and input channels/activations, corresponding to incoming channels which may represent the input images or activations from previous layers of a neural network. The cell processes the received inputs to generate an output feature corresponding to a partial sum of the output feature map. In some embodiments, these may be subsequently normalized and undergo an "activation function" (e.g., rectified linear unit, or ReLU) to map them onto the input domain where they can be used in subsequent layers.

For example, in a cell for performing a MACC function, the cell multiplies a received input weight with a received activation, and adds the resulting product to an input bias (e.g., partial sum) received from an adjacent cell. The resulting sum is output as a bias or sub-result to another adjacent cell, or from the computational array as a result value if no adjacent cell for receiving the resulting sum exists. In some embodiments, each processing cell input is loaded in a single clock cycle. Loading of weights and activations is described in greater detail below.

In some embodiments, each cell comprises an array of sub-cells. For example, a cell may be configured to process weight and activation values each comprising a plurality of elements (e.g., 16 1-byte elements), and comprise an array of sub-cells (e.g., 16 by 16 sub-cells), each configured to process a weight element (e.g., 1-byte weight element) and an activation element (e.g., 1-byte activation element) to generate a respective result. In some embodiments, the computational array comprises an array of 20 by 20 cells, each cell having 16 by 16 sub-cells, resulting in a 320 by 320 element array.

Computational Array Weight Loading

In some embodiments, each cell of the computational array contains one or more registers for locally storing received weight values. This allows activations to pass in independently from weights, obviating the need to time the arrival of both activations and weights in a cell, simplifying the routing of signals into their desired locations. In addition, a particular weight loaded onto a cell may be stored and used for multiple computations involving different activation values.

Figure 4A:
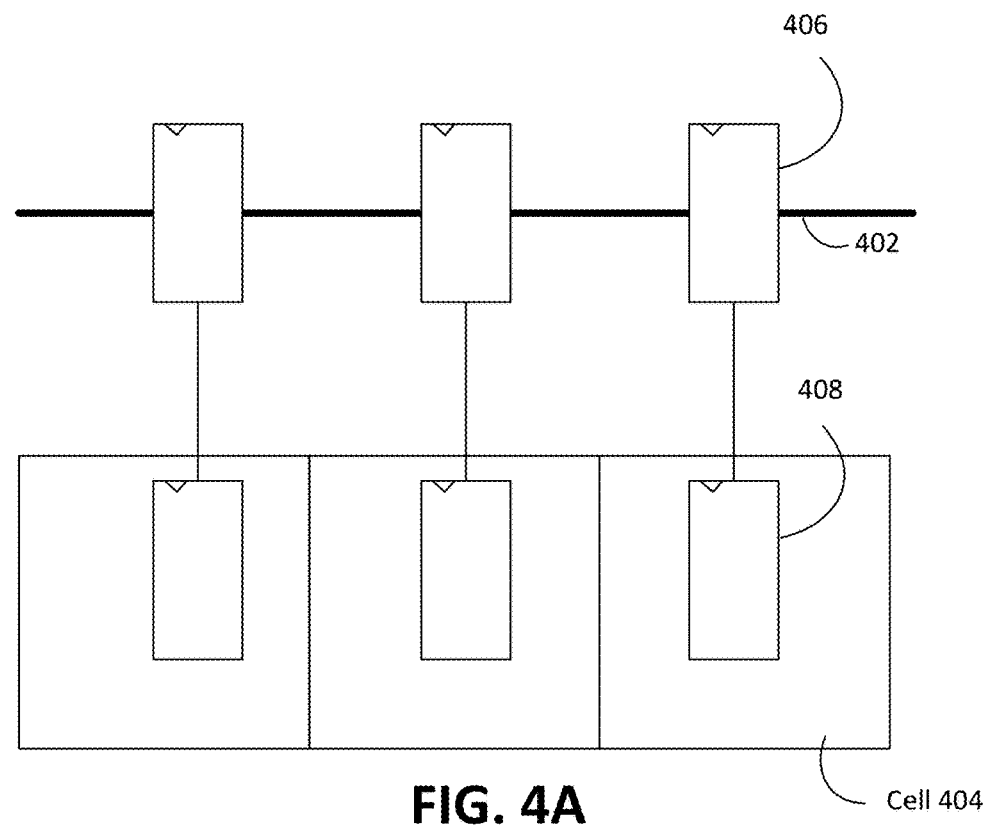
FIGS. 4A and 4B illustrate loading of weights into the cells of a computational array, in accordance with some embodiments.
Figure 4B:
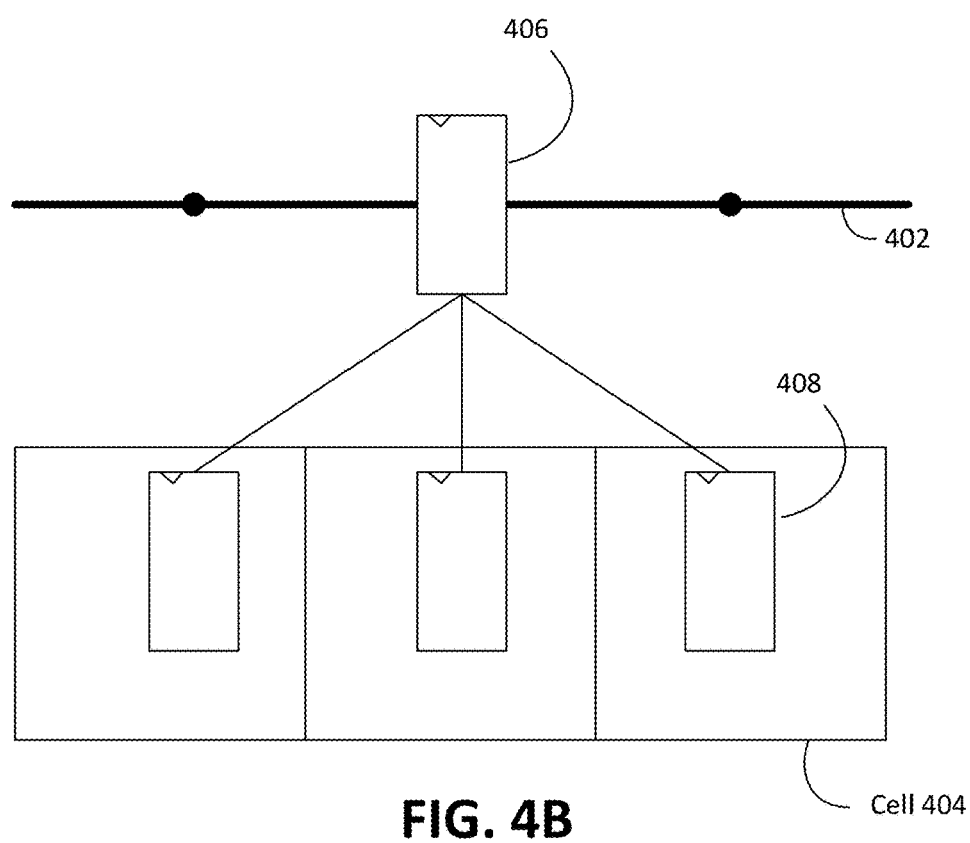

FIGS. 4A and 4B illustrate loading of weights into the cells of a computational array, in accordance with some embodiments. FIG. 4A illustrates how weights may be loaded into a computational array in many typical computational array systems. A weights transmission line 402 spans a row or column of the computational array comprising a plurality of cells 404, and transmits weight values received from a memory (e.g., directly or via a weights buffer). As illustrated in FIG. 4A, a plurality of capture registers 406 are located along the weights transmission line 402. Each capture register 406 is configured to capture a current weight value transmitted by the weights transmission line 402, and pass a previously captured weight value to a subsequent capture register 406 on the weights transmission line 402. In some embodiments, the weights transmission line 402 includes one capture register 406 for each cell 404 of the row or column spanned by the weights transmission line. Each clock cycle, the capture register 406 for a particular cell may pass its currently stored weight value to the next capture register 406 along the weights transmission line 402 corresponding to a subsequent cell, such that each weight value transmitted along the weights transmission line 402 is propagated over a plurality of clock cycles.

Each cell of the computational array includes a weight register 408. During weight loading, each weight register 408 is configured to receive a weight value from a corresponding capture register 406 and store the received weight value for use by the cell in later computations. The weight registers 408 each receive a control signal that controls when each weight register 408 reads from its corresponding capture register 406. For example, the control signal for the weight registers 408 is synchronized with the transmission of weight values through the weights transmission line 402, such that each weight register 408 for a cell 404 reads the currently stored weight value of its corresponding capture register 406 when the capture register 406 receives the weight value to be loaded in the cell 404. The weight values stored on the weight registers 408 may be maintained by the cell 404 and used for computations over multiple cycles.

The coordination of data movement from the memory to the computational array is referred to as "control flow." The control flow is carried out by a controller which issues instructions that describe the operation and data movement (e.g., loading of weight and activation values, output of result values), weight reuse, and coordinated used of the memory elements (e.g. use of and/or bypassing of the weight buffer).

FIG. 4B illustrates how weight values are loaded into a computational array, in accordance with some embodiments. The weights transmission line 402 in FIG. 4B transmits weight values received from a memory. In some embodiments, the weights transmission line 402 corresponds to a plurality of wires forming at least a portion of a data lane corresponding to a row of the computational array that includes the cells 404. However, instead of including a capture register for each of the cells 404, weight data is transmitted over the weights transmission line 402 over a plurality of cells within a single clock cycle, with a capture register 406 located between each plurality of cells. Each of the cells 404 is coupled to the capture register 406, such that weight register 408 of the cells 404 is able to read weight values currently being transmitted over the weights transmission line 402 from the same capture register 406. In some embodiments, each weight register 408 receives a control signal (e.g., a write-enable signal) from the controller indicating whether the weight register 408 is to read the current value being transmitted over the weights transmission line 402 (e.g., from the capture register 406). As such, transmission of weight values over the weights transmission line 402 and the control signals provided to each of the weight registers 408 may be synchronized such that the weight value intended for a particular cell 404 is transmitted along the weights transmission line 402 over the same clock cycle at which a write-enable control signal is provided to the weight register 408 of the particular cell 404 (or with a predetermined offset), such that the cell's weight register 408 is able to receive the transmitted weight value.

In some embodiments, during each of a plurality of clock cycles, the weight transmission line 402 stores a transmitted weight value on the capture register 406 to be read by a cell 404 of a plurality of cells (e.g., based on a received control signal). In embodiments where a cell comprises a plurality of sub-cells (e.g., 16 by 16 sub-cells), a transmitted weight value may comprise weight values for each sub-cell. For example, in some embodiments the weight transmission line 402 comprises 16 wires which each stream 16 values (e.g., a vector of 16 values) onto the capture register 406, which are read by the cell 404 and used as weight values for the 16 by 16 sub-cells of the cell. In some embodiments, a cell 404 receives the transmitted weight value comprising 16 vectors of 16 values, and transposes each vector to provide weight values to a respective column of sub-cells.

In other embodiments, multiple weight values for multiple cells may be transmitted over the weight transmission line 402 during a single clock cycle, where, in response to receiving write-enable signals, the weight registers of each of the cells may receive the multiple weights values aggregated together from the capture register, and extract and store a respective portion of the received weight values in the weight register (e.g., based upon an address of the cell).

By configuring the weights transmission line 402 and the weight registers 408 of the cells such that the weight registers 408 read weight values from capture registers located between sets of multiple cells, the amount of area needed to implement the weights transmission line is reduced. In addition, the reduced number of registers needed to load the weight values reduces the total amount of clock power needed to provide a clock signal to the registers.

In some embodiments, the weights transmission line may only be able to transmit weight values spanning a certain number of cells over a single clock cycle (e.g., over a certain distance). As such, in some embodiments, multiple capture registers may be located along the weights transmission line corresponding to multiple sets of cells in each row of the computational array, dividing each row of the computational array into multiple sections. In some embodiments, a number of cells of each section corresponding to a capture register is based on a distance in which the weights transmission line is able to transmit weight values over a single clock cycle.

Figure 5A:
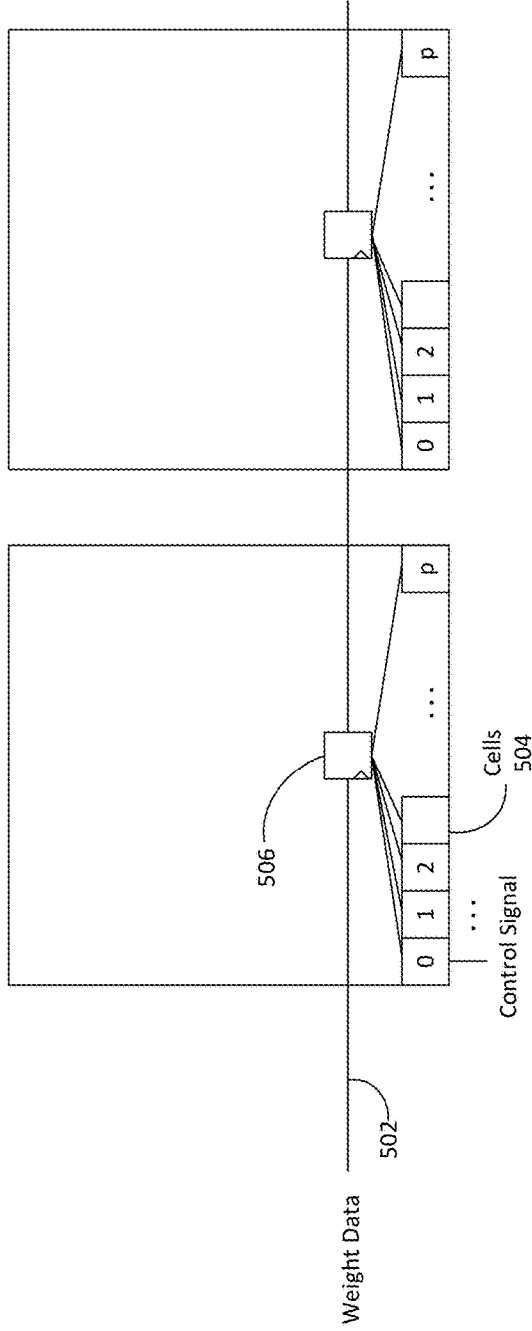
FIG. 5A illustrates loading weights onto a computational array, in accordance with some embodiments.

FIG. 5A illustrates loading weights onto a computational array, in accordance with some embodiments. As illustrated in FIG. 5A, weight data is transmitted over a weights transmission line 502 across a computational array. The weights transmission line 502 is configured to provide weight values to the cells of a particular row of the computational array. Each row of the computational array may contain a plurality of cells (e.g., m cells) divided into sets of p cells (e.g., 10 cells) each.

The weights transmission line 502 transmits a weight value over a set of p cells 504 of the computational array during a single clock cycle. A capture register 506 located along the weights transmission line 502 corresponding to each set of p cells (or between each set of p cells) captures the weight value transmitted by the weights transmission line 502 over the set of p cells, and passes the captured weight value along the weights transmission line 502 to a next set of p cells over a subsequent clock cycle (e.g., to a subsequent capture register). In some embodiments, rather than the capture register 506, different types of elements may be used to ensure the timing of the transmitted weight values across the transmission line. For example, a latch may be used in some embodiments. In other embodiments, the timing at which the weight values are propagated may be kept at the correct rate using wave pipelining techniques.

As illustrated in FIG. 5A, each cell 504 of a set of p cells is able to read and store a weight value transmitted by the weights transmission line 502 over the set of p cells from the capture register 506. In some embodiments, each of the p cells receives a control signal that controls when the cell reads and stores the transmitted weight value from the capture register 506. In some embodiments, the computational array loads p different weight values for the set of p cells over a plurality of cycles (e.g., p cycles), where a different cell loads its respective weight value during each cycle. Because each capture register along the weights transmission line 502 is used to provide weight values to multiple cells within a row of the computational array (e.g., p cells), a total number of clock cycles needed for a row of cells of the computational array to load weight values is reduced, as a number of capture registers that a weight value will need to travel between to reach each cell of the row is reduced. For example, loading weight values for two sets of p cells (e.g., as illustrated in FIG. 5A) may be performed in 2p+1 clock cycles (where the extra 1 clock cycle accounts for a clock cycle needed to transmit weight values from the first capture register to the second capture register).

In some embodiments, each cell of the computational array receives a control signal from a controller. In other embodiments, the controller transmits a control signal to a subset of cells, which then propagate the control signal to the remaining cells of the computational array over one or more subsequent clock cycles. For example, in some embodiments, each cell may be configured to store its received control signal in a control signal register, and propagate the control signal to an adjacent cell in the vertical direction, in the horizontal direction, or both, over a subsequent clock cycle. The transmission of weight values over the weights transmission line 502 may be timed based upon the propagation of control signals, such that each cell reads from the weights transmission line when the weight value intended for the cell is being transmitted.

Figure 5B:
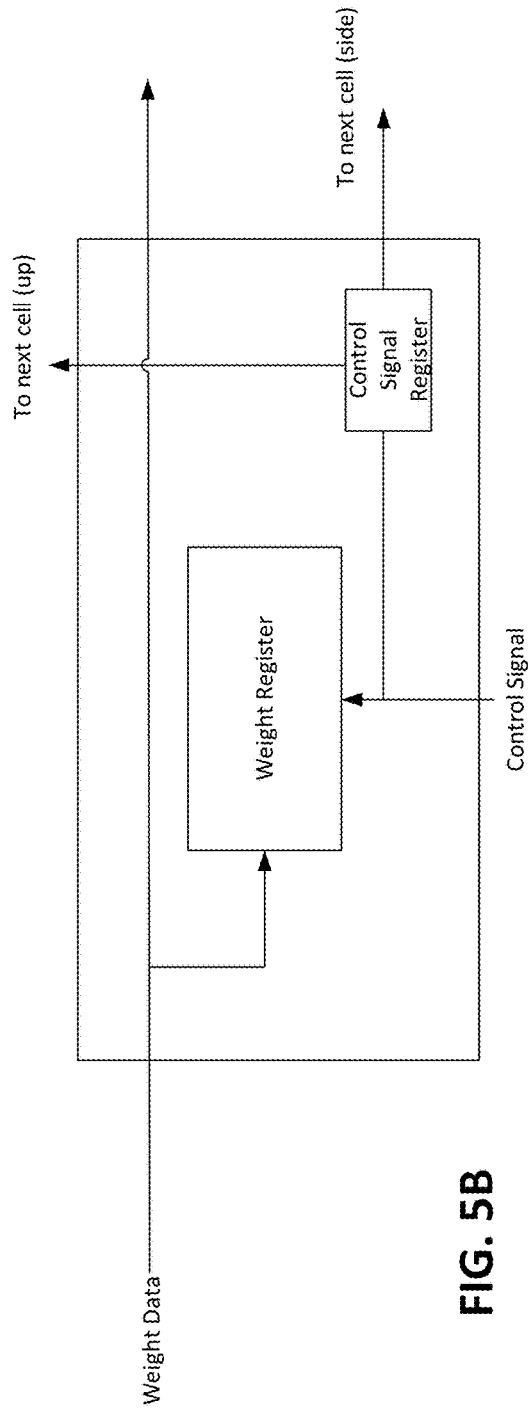
FIG. 5B illustrates how a control signal may be used when loading weights for a cell of a computational array, in accordance with some embodiments.

FIG. 5B illustrates how a control signal may be used when loading weights for a cell of a computational array, in accordance with some embodiments. In some embodiments, each cell receives a control signal that indicates whether or not the cell is to read weight values currently being transmitted over the weights transmission line into the weight register of the cell. For example, the control signal may comprise a "0" or a "1", where "0" indicates that the cell should not read the currently transmitted weight value into the weight register, while "1" indicates that the cell should read the currently transmitted weight value into the weight register.

In some embodiments, each cell stores a received control signal using a control signal register. The control signal register may store the value of the control signal, and provide the control signal to a subsequent cell of the computational array over a subsequent clock cycle. For example, as illustrated in FIG. 5B, the control signal register for a cell may provide the control signal to a subsequent cell of a next row of the computational array (e.g., a cell directly above the current cell), as well as a subsequent cell of a next column of the computational array (e.g., a cell directly to the right of the current cell). Propagating the control signal through adjacent cells simplifies the wiring required to provide the control signals to the cells of the computational array, as the cells of the array may be connected to each other, instead of requiring a separate control wire for each cell. In some embodiments, the control signal register of the cell may provide the control signal to only a cell of a next row (e.g., to propagate the control signal up its column of cells in the computational array), and not to a cell of a next column.

Figure 5C:
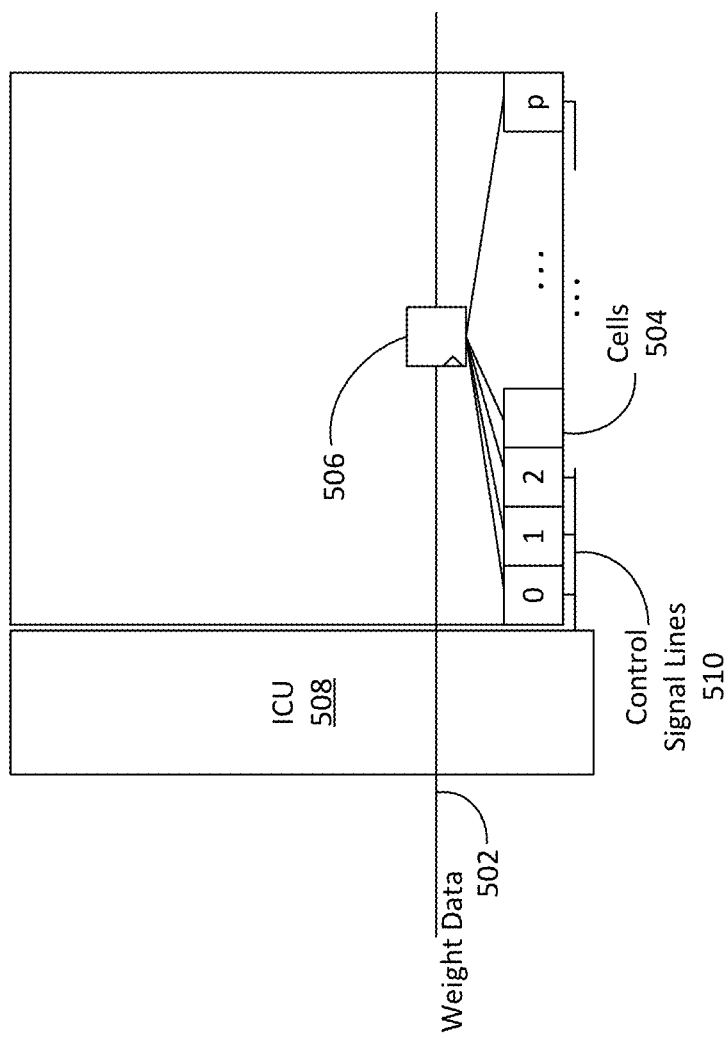
FIG. 5C illustrates a diagram of how control signals may be received by the cells of a computational array, in accordance with some embodiments.

In some embodiments, the cells of the computational array are configured to receive control signals from a different direction from which data (e.g., weight data) is received. FIG. 5C illustrates a diagram of how control signals may be received by the cells of a computational array, in accordance with some embodiments. As illustrated in FIG. 5C the computational array may be associated with an instruction control unit (ICU) 508. The ICU 508 is preferably located proximate to the memory and the computational array. In other embodiments, the ICU 508 may be located on an opposite side of the computational array as the memory. The ICU 508 is configured to receive at least one instruction, and to generate, for each column of the computational array, a respective command signal. As shown in FIG. 5C, the ICU 508 transmits control signals to cells of the computational array via control signal lines 510 along an edge of the computational array (e.g., bottom edge) that is perpendicular to the edge (e.g., left edge) through which data (e.g., weight values) are transmitted. In some embodiments, because the control signal data is typically much smaller in size in comparison to data for weight and activation values used by the computational array (e.g., two orders of magnitude smaller), the amount of wiring needed to transmit the control signals is much smaller than the wiring for transmitting weight and activation values. As such, the control signals may be transmitted via a different side of the computational array as the weights and/or activations, without requiring significant additional circuitry along the different side of the computational array.

In some embodiments, because each cell is configured to propagate the control signal to up to two adjacent cells (e.g., an adjacent cell in the vertical direction, and an adjacent cell in the horizontal direction, e.g., as illustrated in FIG. 5B), the control signal may be propagated through the computational array diagonally (e.g., starting from a corner of the array and propagating towards an opposite corner of the array). However, propagation of the control signal from one corner of the computational array to the opposite corner may require weight values to be loaded for all cells of the computational array, with no option to load weight values for only a portion of the cells of the computational array. For example, a control signal received by a corner cell of the computational array may cause the cell to load a weight value during a first clock cycle, which is then propagated to the remaining cells of the computational array, causing each of the remaining cells to load weight values during subsequent clock cycles. In other embodiments, control signals may be received by all cells of a particular row or column, and then propagated across the computational array. For example, each cell of a rightmost column of the computational array may receive a control signal causing the cell to load a weight value during a first clock cycle, which is then propagated across the rows of the computational array over subsequent clock cycles (e.g., to a second cell of each row during a second clock cycle, and so forth). Propagation of the control signal in this way may allow for the weight value loading for only a subset of rows of the computational array.

Figure 6:
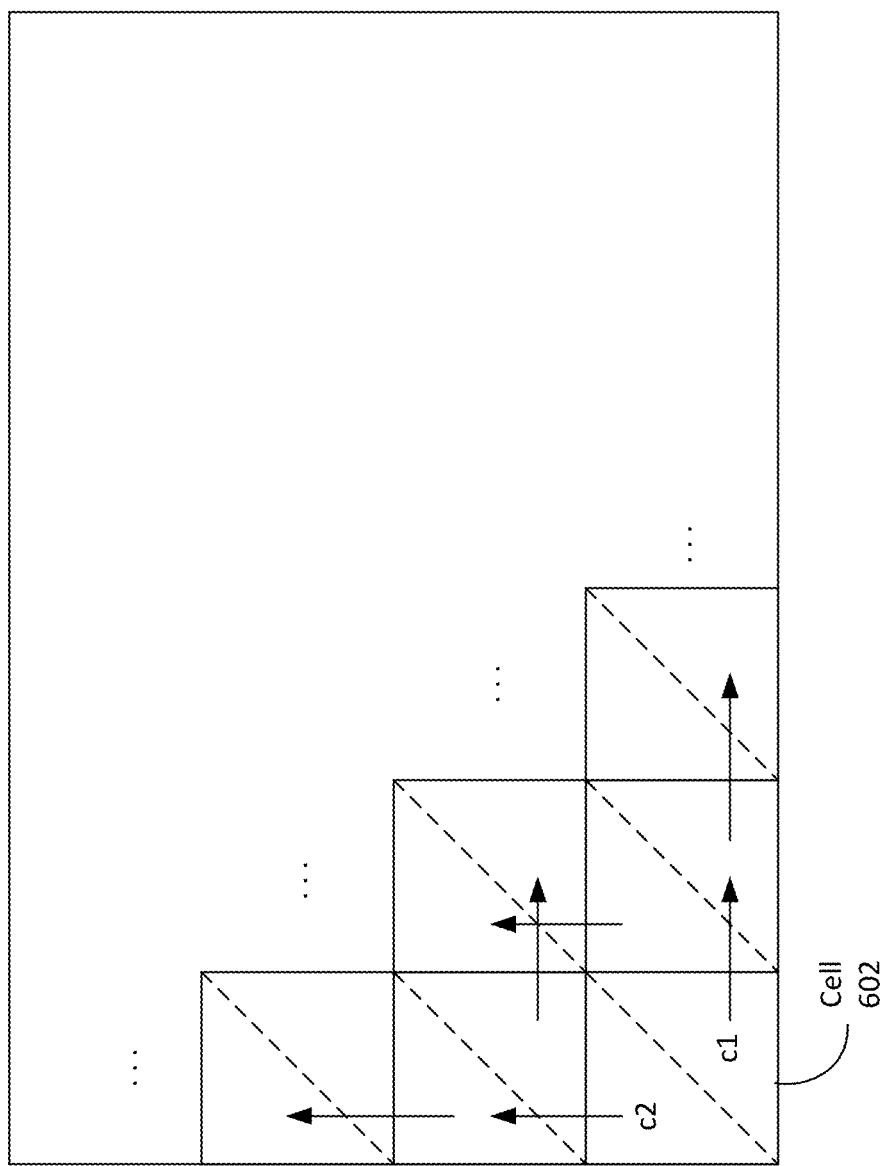
FIG. 6 illustrates propagation of vertical and horizontal portions of a control signal through a computational array, in accordance with some embodiments.

In some embodiments, in order to allow for weight value loading for only desired portions of the computational array (e.g., a specific rectangular sub-region of the computational array), the control signal may comprise two separate parts propagated through the computational array in two different directions. For example, the control signal may comprise a vertical portion and a horizontal portion. FIG. 6 illustrates propagation of vertical and horizontal portions of a control signal through a computational array, in accordance with some embodiments. As illustrated in FIG. 6, each cell 602 of the computational array 600 may receive a first control signal portion c1 corresponding to a horizontal portion, and a second control signal portion c2 corresponding to a vertical portion.

Each of the horizontal portion c1 and vertical portion c2 may comprise an indicator of whether the cell should read the currently transmitted weight value into its weight register (e.g., a "0" or "1" value), wherein the cell only reads the weight value if both the vertical and horizontal portions indicate that the weight value should be read (e.g., both c1 and c2 have a "1" value). On the other hand, if either c1 or c2 indicates that the cell should not read the current weight value from the weights transmission line (e.g., either c1 or c2 has a value of "0"), then the cell does not read the currently transmitted weight value.

The controller may provide a control signal portion to each cell on an edge of the computational array to be propagated across the array. For example, the controller may provide a horizontal portion c1 of a control signal to each cell on vertical edge of the computational array 600 (e.g., the left edge), and a vertical portion c2 to each cell on a horizontal edge of the computational array 600 (e.g., the bottom edge), each of which may then be propagated across the array in a horizontal or vertical direction, respectively, over subsequent clock cycles. Each cell propagates the vertical portion c2 of the control signal only in a vertical direction, and the horizontal portion c1 only in a horizontal direction.

By splitting the control signal into separate portions (e.g., horizontal portion c1 and vertical portion c2), and reading from the weights transmission line only when both portions of the control signal indicate so (e.g., both portions of the control signal are 1), the computational array can be configured to load weights for specific portions of the computational array. The control signal loading scheme illustrated in FIG. 6 may be referred to as diagonal loading, in that the control signals controlling the loading of weight values propagate along a diagonal that moves across the computational array over a number of clock cycles.

Figure 7A:
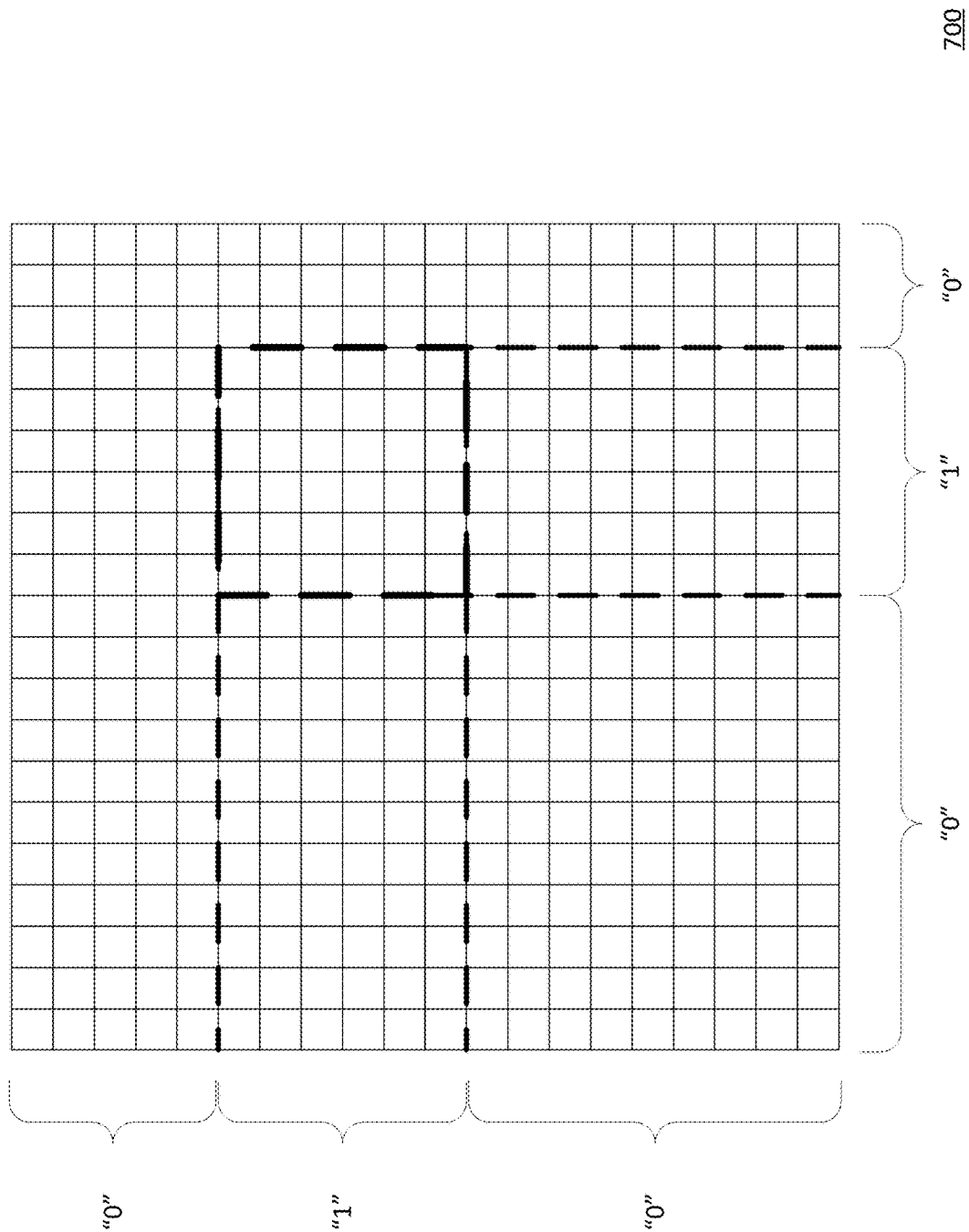
FIG. 7A illustrates a computational array in which weights are loaded in only a specific portion of the array, in accordance with some embodiments.

For example, FIG. 7A illustrates a computational array in which weights are loaded in only a specific portion of the array, in accordance with some embodiments. As illustrated in FIG. 7A, the computational array 700 receives control signal portions along a vertical edge (e.g., right edge) and a horizontal edge (e.g., bottom edge), which are propagated across the array on a horizontal and a vertical direction, respectively. The control signal portions may comprise a "1" value or a "0" value, indicating whether a cell should load weight values currently being transmitted along an associated weights transmission line. As such, the horizontal control signal portions may specify rows of the computational array for loading weights, while the vertical control signal portions may specify columns of the computational array for loading weights.

Because each cell loads weights transmitted along the weights transmission lines of the array based on both portions of received control signals, only the cells of the computational array located on rows and columns both having a control signal portion of "1" will load weights, while the remaining cells of the computational array will not load weights. As such, by loading weights in cells of the computational array based on the intersection of horizontal and vertical control signals, weight loading may be performed for specific regions of the computational array, instead of requiring weight values to be loaded for all cells of the computational array.

Figure 7B:
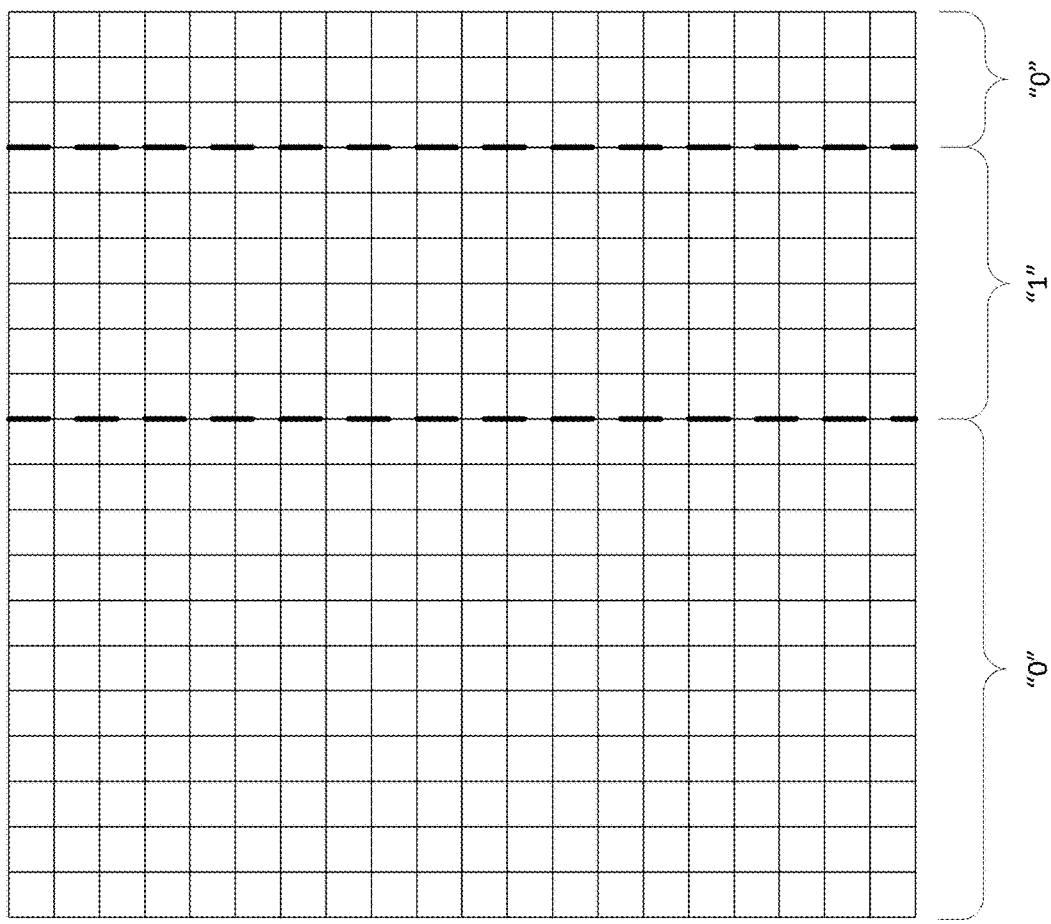
FIG. 7B illustrates a computational array in which weights are loaded in only a specific portion of the array, in accordance with some embodiments.

In some embodiments, instead of each cell receiving a control signal portion along both a vertical edge and a horizontal edge, the cells of the computational array are configured to receive control signals from a single direction (e.g., vertically). FIG. 7B illustrates a computational array in which weights are loaded in only a specific portion of the array, in accordance with some embodiments. In some embodiments, the cells of the computational array are configured to receive control signals along each column, e.g., as illustrated in FIG. 5C. As illustrated in FIG. 7B, each column of the computational array 710 receives a signal indicating whether the column should load weight values transmitted along an associated weights transmission line. In some embodiments, as all cells of the column that receive a "1" command will load weight values, cells of the column corresponding to rows outside a desired region may receive zero-value weights. In other embodiments, the cells of the column receive a command that indicates a row range, wherein each cell loads or does not load weight values based on whether it is within the indicated row range. In some embodiments, configuring the computational array to receive control signals in only a single direction (e.g., vertically) may simplify wiring and routing. As such, the computational array may be configured to separate the receipt of control signals from the receipt of data (e.g., weight and/or activation values), where control signals are transmitted via a first direction (e.g., vertically), while data is transmitted in a second, different direction (e.g., horizontally).

In some embodiments, the columns of the computational array are associated with an instruction control unit (ICU). The ICU is configured to receive an instruction for one or more columns, and determine a control signal to be sent to the cells of each column. For example, in some embodiments, the ICU receives an install weights instruction for the cells of the computational array. The install weights instruction may comprise at least a start column parameter and/or an end column parameter. The ICU parses the instruction and determines a command to be provided to the cells of each column, e.g., a "1" command if the column is between the start and end columns indicated by the instruction, or a "0" command otherwise. In some embodiments, the instruction may further contain a parameter indicating a topmost row indicating a row of the column at which the results of the cell are to be propagated downwards instead of upwards (to be described in greater detail below).

Although FIGS. 7A and 7B illustrate only a single region of the computational array as loading weights, in other embodiments, the control signal portions can be configured to load weights for multiple non-continuous regions of the computational array, based on which rows and columns of the computational array are provided horizontal and vertical control signal values of "1."

Being able to load weights only in specific sub-regions of the computational array allows for more efficient processing of models with low batch sizes. For example, for a computational array having 16×16 cells, if only a 2×16 region of the array is needed to implement a model, then only 2 clock cycles are needed to reload weight values onto the array, allowing for weight values for the model to be loaded every 2 clock cycles.

Weight Loading Order

Figure 8B:
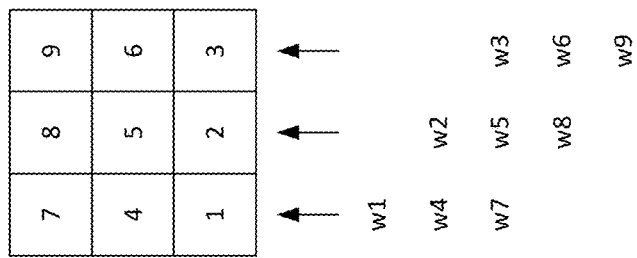
FIGS. 8A-8C illustrate order and timing of weight transmission, in accordance with some embodiments.
Figure 8C:
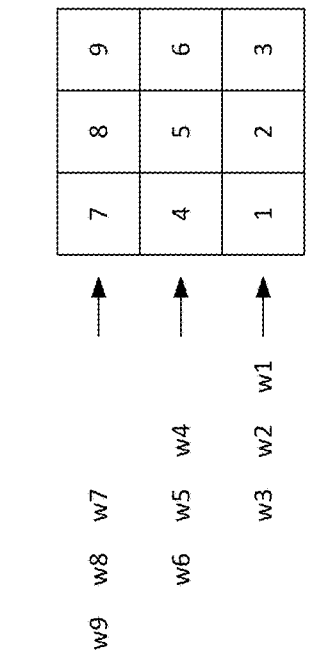
Figure 8A:
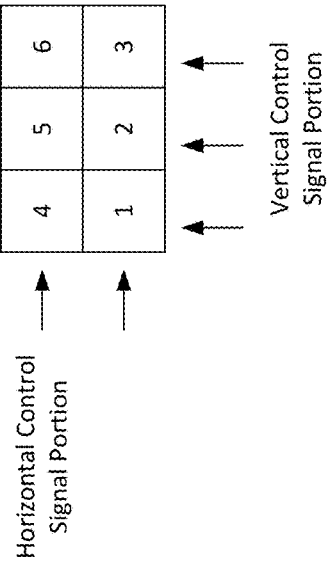

FIGS. 8A-8C illustrate order and timing of weight transmission to cells of the computational array, in accordance with some embodiments. As discussed above, the transmission of weight values along the weights transmission lines is synchronized with the propagation of control signals across the cells of the computational array, in order to load the correct weight values into each cell. Because the control signals for the cells may be propagated diagonally across the computational array, the transmission of weight values across the weight transmission lines for each row or column of the computational array may be ordered and staggered to reflect the propagation of control signals. For purpose of example, each of the FIGS. 8A-8C illustrate a computational array having nine cells arranged in three rows and three columns.

FIG. 8A illustrates the providing of control signals to a computational array, in accordance with some embodiments. Similar to the computational array 700 illustrated in FIG. 7A, control signal portions are received by cells on the bottom and left-side edges of the array, and propagated upwards and rightwards across the array respectively over a plurality of subsequent clock cycles. Because the propagated control signal is received by different cells of the computational array at different times, the timing and order of weight values transmitted over weight transmission lines to be loaded onto the cells of the computational array may depend upon the direction and orientation of the weights transmission lines over the computational array. Although FIG. 8A illustrates horizontal control signal portions as provided to the cells of the computational array via a horizontal direction, it is understood that in some embodiments, the horizontal control signal portions may be provided to the leftmost cells of each row (e.g., cells of the first column) via a control signal line extending in the vertical direction (e.g., such that all control signal lines that provide control signals to the cells of the computational array extend in the vertical direction). In embodiments where the horizontal and vertical control signals are propagated to a subsequent cell per row/column each clock cycle, the horizontal control signal portions and vertical control signal portions may each be provided in a staggered fashion (e.g., the cells of each row receiving horizontal control signal portions one clock cycle behind those of a previous row, and cells of each column receiving vertical control signal portions one clock cycle behind those of a previous column), to maintain a timing at which each cell receives respective horizontal and vertical control signal portions instructing the cell to load weight data.

In other embodiments, control signals are propagated to cells of the computational array in only one direction (e.g., the vertical direction). For example, a bottom cell of each column of the computational array may receive a control signal via a respective control signal line (e.g., as illustrated in FIG. 5C), and propagate the received control signal to subsequent cells in its respective column. In some embodiments, the control signals for each column are staggered. For example, the control signals may be staggered such that the bottom cell of a first column receiving a write-enable control signal during a first clock cycle, and the bottom cell of a second column receiving a write-enable control signal during a second clock cycle, and so forth, such that each cell of a given row of the array receives a write-enable control signal during a different clock cycle. This may be performed so that each cell of a given row of the computational array can load a different weight value (e.g., from a capture register along a weights transmission line for the row).

FIG. 8B illustrates order of weight loading in a computational array where weights are loaded by columns, in accordance with some embodiments. Each of the cells 1-9 of the computational array are to be loaded with a respective weight value w1-w9. The computational array may be associated with a plurality of weights transmission lines corresponding to each of the columns of the computational array (e.g., three weights transmission lines corresponding to three columns of the computational array).

The weight values w1-w9 are loaded on the weight transmission lines in an order that matches the propagation of control signals through the cells of the computational array. For example, cell 9 may receive vertical and horizontal portions of a control signal (e.g., vertical and horizontal portions of a control signal as illustrated in FIG. 8A, or staggered control signals received via the vertical direction, as discussed above) during a first clock cycle indicating that it should load a weight value being transmitted on the weights transmission line during a certain time (e.g., during the first clock cycle). As such, to match the timing of the control signal, the weight value w9 is transmitted over the weights transmission line corresponding to the column of cell 9 during the first clock cycle. During a second clock cycle, weights w6 and w8 are loaded into their respective cells. During a third clock cycle, weights w3, w5, and w7 are loaded, followed by weights w2 and w4 during a fourth clock cycle, and weight w19 during a fifth clock cycle. As such, the weight values w1-w9 are loaded in an order based upon the columns of the computational array, the weight values for each column staggered based upon a propagation of control signals across the cells of the computational array.

FIG. 8C illustrates order of weight loading in a computational array where weights are loaded by rows, in accordance with some embodiments. In the example illustrated in FIG. 8C, the weight transmission lines span across each row of the computational array (e.g., three weights transmission lines corresponding to three rows of the computational array). Because the control signals are propagated in the same manner across the cells of the computational array as in FIG. 8B, the same weight values are transmitted over each clock cycle (e.g., w1 over a first clock cycle, w2 and w4 over a second clock cycle, w3, w5, and w7 over a third clock cycle, w6 and w8 over a fourth clock cycle, and w9 over a fifth clock cycle). However, because the weight transmission lines are oriented across rows instead of columns as illustrated in FIG. 8B, the distribution of the weight values over the different weight transmission lines spanning rows is transposed relative to how the weights were distributed over weight transmission lines spanning columns. For example, while FIG. 8B illustrates the weights w1, w2, and w3 being transmitted over different weight transmission lines, in the configuration of FIG. 8C, the weights w1, w2, and w3 are transmitted with the same timing but on the same transmission line. Similarly, while FIG. 8B illustrates the weights w1, w4, and w7 transmitted over the same weights transmission line during different clock cycles, in the configuration illustrated in FIG. 8C, the weights w1, w4, and w7 are transmitted over different weights transmission lines but with the same timing.

As such, the timing of how weight values are transmitted over the weight transmission lines depends upon the timing of control signals propagating through the cells of the computational array. In addition, the distribution of the weight values over the different weight transmission lines depends upon the orientation and direction of the weight transmission lines, wherein the distribution of weight values is transposed when the weight transmission lines are horizontal relative to when the weight transmission lines are vertical.

By transposing the order of loaded weight values, the weight loading can be aligned with the input activation flow. By aligning weight loading and activation loading, the size of the computational array may be more easily scaled (e.g., as discussed with relation to FIGS. 2A and 2B). In addition, an amount of wiring needed to implement the weights and activations transmission lines for loading weight and activation values into the computational array may be greatly reduced.

Figure 9B:
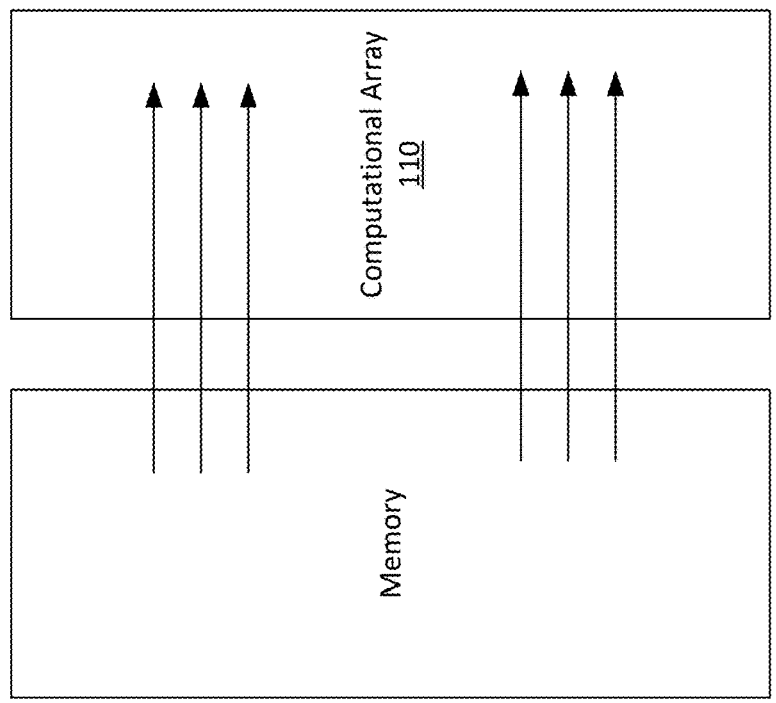
FIG. 9B illustrates a high level diagram of a computational array in which weight loading and activation loading is aligned, in accordance with some embodiments.
Figure 9A:
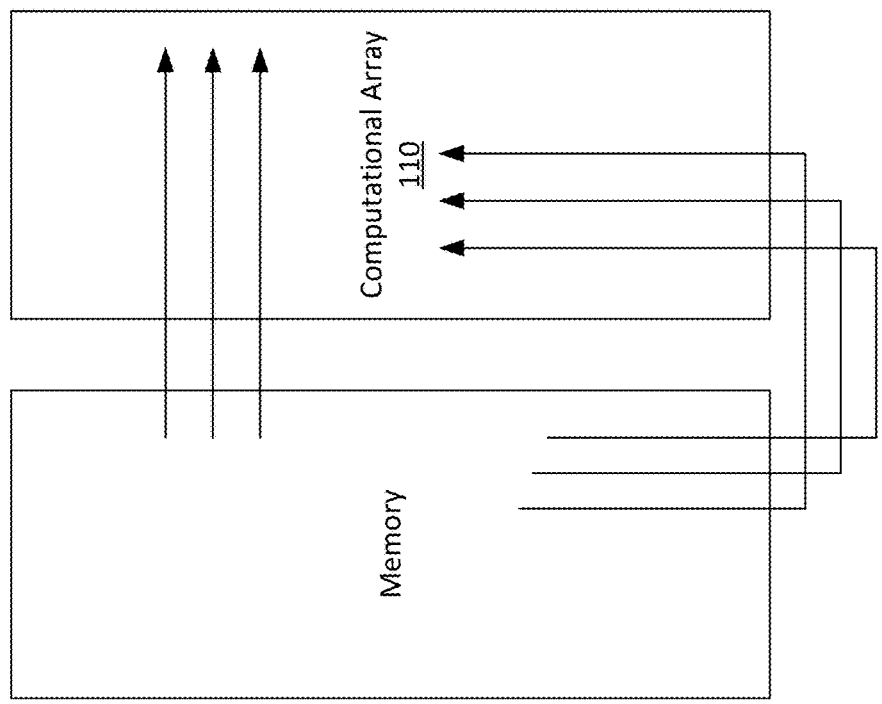
FIG. 9A illustrates a high level diagram of a computational array in which weights and activations are loaded from different sides, in accordance with some embodiments.

FIG. 9A illustrates a high level diagram of a computational array in which weights and activations are loaded from different sides, in accordance with some embodiments. As illustrated in FIG. 9A the memory is able to load activation values onto the computational array via activation transmission lines that span the horizontal width of the computational array. The activation transmission lines are routed directly from the memory to the edge of the computational array (e.g., the left edge of the computational array) and extend across the computational array. On the other hand, weight values are loaded onto the computational array from a different direction (e.g., vertically from the bottom edge). As such, in order to load weight values onto the computational array from the bottom edge, the weight transmission lines must extend to bottom edge of the memory, across the distance between the bottom edge of the memory and the respective columns of the computational array, and span the length of the columns of the computational array. Consequently, the amount of wiring needed to load the weight values may be significantly greater than that needed to load the activation values. In some embodiments, the computational array is configured such that each cell of the computational array is longer in one dimension (e.g., rectangular instead of square). In cases where the weight transmission lines must extend across the longer dimension of the computational array (e.g., as illustrated in FIG. 9A), the additional amount of wiring needed to load the weight values onto the computational array is further increased. Furthermore, in some embodiments, in order to preserve timing, the length of the transmission lines to each column of the computational array may need to be matched in length, requiring additional wiring even for columns of the computational array that are closest to the memory.

On the other hand, FIG. 9B illustrates a high level diagram of a computational array in which weight loading and activation loading is aligned, in accordance with some embodiments. As illustrated in FIG. 9B, both weights transmission lines and activations transmission lines can be colinearly routed directly from the memory to the computational array, and span the horizontal width of the computational array, greatly decreasing an amount of wiring needed to route the weights and activations transmission lines. This may both reduce an am area needed to accommodate the circuitry for loading operands onto the computational array, as well as potentially reducing an amount of latency when loading operands on the computational array. In embodiments where the computational array is longer in one dimension, the computational array and memory may be placed such that the weights and activation lines span the shorter dimension of the computational array, which both reduces an amount of wiring needed, as well as allows for the weight transmission lines to contain fewer capture registers (e.g., as illustrated in FIG. 5A), due to each weight transmission line needing to span a shorter distance across the computational array. Furthermore, because each of the weights transmission lines spans the horizontal width of the computational array, uniformity in length of the weight transmission lines is more easily maintained compared to if the weight transmission lines were routed to a bottom edge of the computational array and up respective columns of the array. In addition, because the weight transmission lines do not need to turn corners to reach the computational array 110, wire congestion is reduced, and space on the chip for arranging wiring can be more efficiently utilized.

Output of Result Values Along Same Side

In some embodiments, in addition to weights and activations being able to be loaded from the same first side of the computational array, results generated by the computational array through processing of the weight and activation values are also be output from the first side. In some embodiments, the output result values may be stored in memory and used as activation values for later computations. By outputting the result values from the same side of the computational array that activation values are loaded from, an amount of wiring needed to store the results and reload them at a later time as new activation values may be reduced.

In some embodiments, computed result values are routed based upon a diagonal of the computational array, such that they can be output from the same side of the computational array as where the weight and activation values are loaded, while maintaining timing (e.g., all result values calculated by the computational array can be output by the array a set amount of time after they are calculated). The diagonal of the array bifurcates the array into upper and lower-triangles.

Figure 10A:
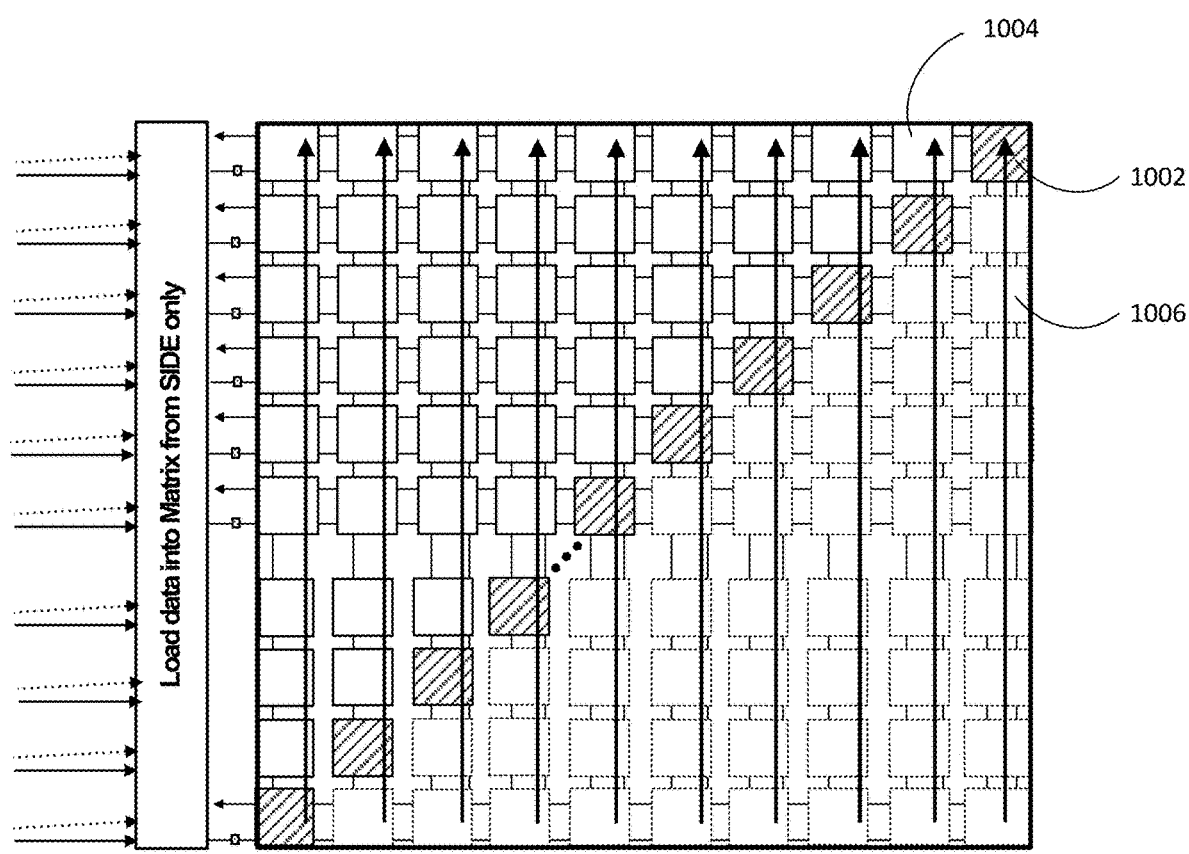
FIG. 10A illustrates a diagram of a computational array in which result values are calculated, in accordance with some embodiments.

FIG. 10A illustrates a diagram of a computational array in which result values are calculated, in accordance with some embodiments. As illustrated in FIG. 10A, the weight and activation values (operands) are loaded from the same side of the computational array (via a plurality of weight transmission lines, e.g., as described above, which may be collectively referred to as the weight transmission channel, and a plurality of activation transmission lines, which may collectively be referred to as the activation transmission channel). For example, in some embodiments, the weight transmission channel and activation transmission channel extend across a side edge of the computational array, and are coupled to a first cell in each row of the computational array. In addition, result values are calculated by aggregating the outputs of the cells of each column of the array, producing results values at the top of each column of the array. In some embodiments, cells at the top of each column in the computational array may comprise one or more post-processing circuits to perform one or more post-processing functions on the produced result values.

Because the result values are determined at the top cell of each column of the array, routing the result values to be output from the top edge of the array may be relatively simple (as the top cells of each column of the array are all adjacent to the top edge). However, in order to route the result values to be output from the same side of the computational array that the operands are loaded at (e.g., the left edge, via a plurality of results output lines, or collectively, a results output channel), the routing should be configured such that a time for each result to be output by the computational array after it is calculated is constant, regardless of which column the result value was calculated at.

Figure 10B:
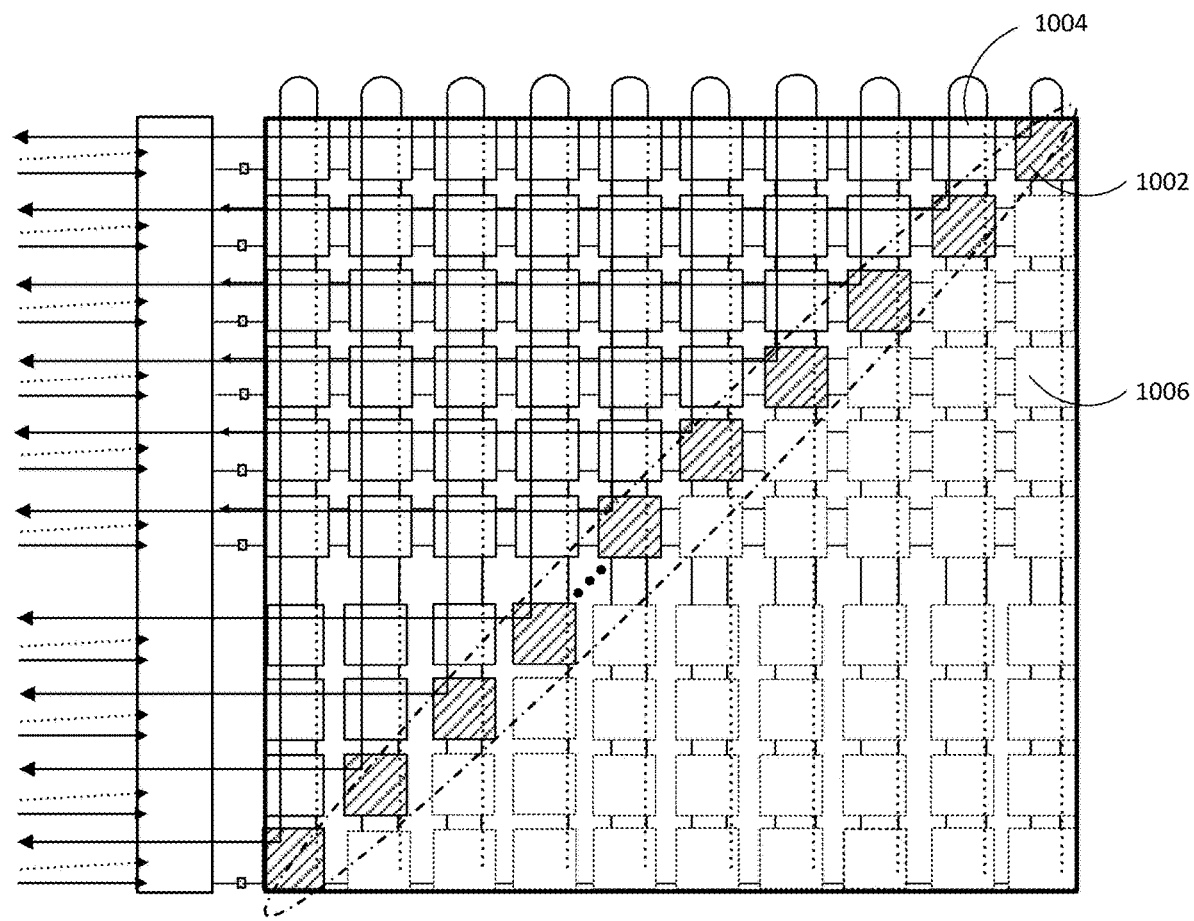
FIG. 10B illustrates the result paths for outputting the aggregated results values at the top cell of each column of the array, in accordance with some embodiments.

FIG. 10B illustrates the result paths for outputting the aggregated results values at the top cell of each column of the array. The results are propagated in an opposite direction (e.g., downwards), reflected about the diagonal, and emerging from the same side as where the operands were loaded. By shifting the result values downwards and reflecting from the diagonal, the number of clock cycles needed to output the result values from each column of the array is made constant.

Thus, in the embodiment illustrated in FIGS. 10A and 10B, weights are first loaded and stored in their respective cells from the left side of the array (e.g., using the techniques described with respect to FIGS. 4 and 5 above). Activations are passed into the array from the same side and processed based upon the weight values. Once processed, each cell produces a sub-result, which are aggregated across the cells for each column. The final result value is produced by the last cell in each column (e.g., the top cell), corresponding to an aggregation of the sub-results of all cells in the column.

As illustrated in FIG. 10B, when the result value is produced at the top cell of each column of the array, it is first reflected downwards along the same column. Upon reaching the diagonal, the result values are then reflected off the diagonal and routed out of the computational array towards the first side of the computational array (e.g., to the left). By reflecting the result values downwards and off the diagonal, the number of cells passed through by each result value to where it is output from the first side is the same for all columns of the computational array. As such, even though some result values are generated in columns of the computational array that are closer to the first side, the amount of time for a result value to be output from the computational array after it has been calculated is constant for all columns.

At least a portion of the cells of the computational array include a routing circuit configured to route the final result values of the computational array (e.g., determined at the top cell of each column) to be the first set of the computational array for output. As shown in FIGS. 10A and 10B, the cells of the computational array are divided into diagonal cells 1002, routing non-diagonal cells 1004, and non-routing cells 1006. When a final result value is produced (e.g., at the top cell of each column of the array), routing circuits of the diagonal cells 1002 and routing non-diagonal cells 1004 of the computational array route the final result values to the first side of the computational array, while the non-routing cells 1006 are not involved in the routing of the final result values.

The techniques illustrated in FIGS. 10A and 10B for routing output data (e.g., final result values) out the first side of the computational array may be applied to computational arrays having n rows by m columns. The computational array produces m result values at the top cell of each of the m columns, which are propagated downwards along each column (by the active non-diagonal cells of the column) until a diagonal cell is reached. In embodiments where n and m are not equal, the diagonal cells may be designated as the i-th topmost cell of each column, starting from the column opposite the first side (e.g., first top-most cell of the column farthest from the first side, second top-most cell of the column second farthest from the first side, etc.). The result values are "reflected" from the diagonal cells and propagated along the row of its respective diagonal cell, ensuring that all results are output from the first side of the computational array with the same timing. In some embodiments, the computational array may be configured to have a number of rows greater than or equal to a number of columns, to ensure there are sufficient rows from which the result values can be output from. In some embodiments, a matrix to be multiplied using the computational array may be transposed such as that m<n.

Figure 11:
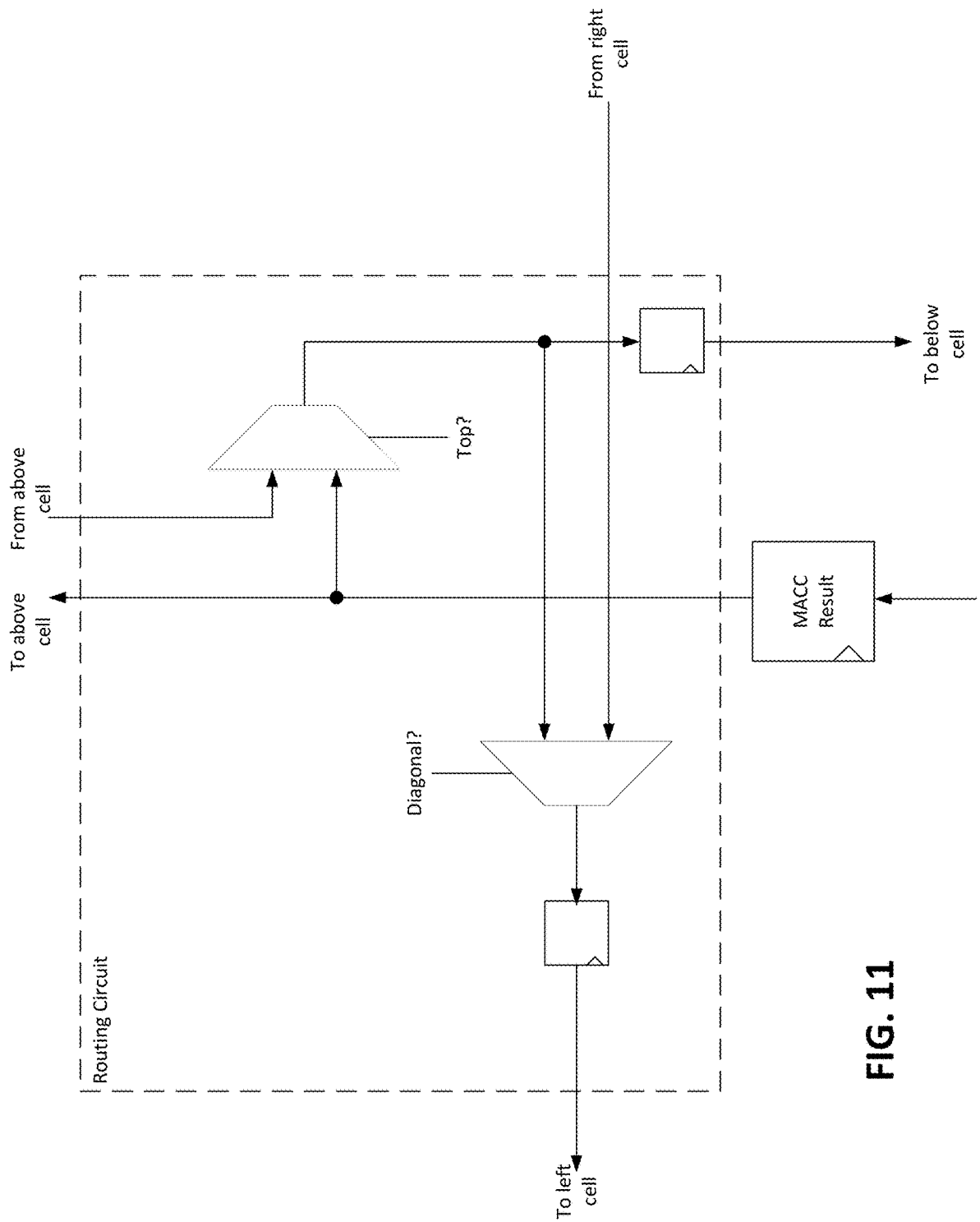
FIG. 11 illustrates a high level circuit diagram showing routing of result values by an individual cell within the array, in accordance with some embodiments.

FIG. 11 illustrates a high level circuit diagram of a routing circuit within an individual cell of the array for routing the result values, in accordance with some embodiments. Each cell of the array comprises a routing circuit. The routing circuit receives a sub-result value of the cell (e.g., MACC result, corresponding to a processed value generated by processing a weight value and an activation value, aggregated with a sub-result value or partial sum received from a previous cell in the column, if any), and passes the result to a next cell in the column (e.g., above cell), if any. If there is no next cell (e.g., the current cell is the top cell of the column), then the sub-result value of the cell will be the result value to be output by the computational array (e.g., final result value).

The routing circuit stores indications of whether the cell is on the top row of the array and whether the cell is on the diagonal of the array. In some embodiments, the controller transmits to each cell within the array an indication as to whether it is a top cell or a diagonal cell. This allows for different cells within the array to be top cells and/or diagonal cells. For example, if only a portion of the array is used for computation (e.g., as illustrated in FIGS. 7A and 7B), the cells designated as top cells and diagonal cells will be different in comparison to if the entire array or an entire plane of the array is used for computation. In some embodiments, the computational array receives an instruction (e.g., an install weights instruction) indicating a start column, end column, and/or top row. The ICU may determine which cells are a top or diagonal cell, based upon the instruction parameters, and transmit appropriate indications to each cell (e.g., as part of a command signal). In other embodiments, each cell may receive one or more instruction parameters (such as an indication of a top row, start column, and/or end column), and determine whether it is a top or diagonal cell. In addition, each cell may determine (or receive an indication of) whether it is a routing cell or non-routing cell (e.g., whether it is above or below the diagonal).

If the cell is on a top row of the array, then the sub-result of the cell corresponds to the result value for the column of the array to be output (e.g., final result value). As such, the routing circuit reflects the result downwards along the same column. On the other hand, if the cell is not a top cell, then the result of the cell is not the final result value to be output, and the routing circuit instead propagates the result of the cell to a next cell in its column (e.g., upwards) for further calculation, and receives a result received from an above cell (corresponding to a previously calculated result value that has not yet been output) and propagates it downwards to a below cell.

If the cell is on the diagonal of the array, then the routing circuit is configured to receive the result value (e.g., the MACC result of the cell if the cell is also a top cell, or the result from an above cell) and reflect it to the left. On the other hand, if the cell is not on a diagonal, it receives a result from the cell to the right, and propagates it left (to a subsequent cell, or output from the left side of the computational array).

Although FIG. 11 illustrates routing the result values in particular directions, it is understood that the same techniques may be used to route result values in other directions or towards other sides of the computational array. In addition, while FIG. 11 illustrates using multiplexers in each cell, in other embodiments, routing of result values by the cell may be performed in other ways. For example, in some embodiments (e.g., where a size of the computational array is fixed), a cell may be hardwired to route result values in certain directions, based upon its position in the computational array. In some embodiments, each cell may route result values using one or more switches or other types of circuitry. In some embodiments, the routing circuit may be configured to check if the cell is not a diagonal cell before routing the result to a below cell.

In some embodiments, only the diagonal cells 1002 and active non-diagonal cells 1004 of the computational array contain routing circuits, while the inactive cells 1006 of the computational array do not contain routing circuits. In other embodiments, where the size of the computational array is configurable (e.g., using control signals as illustrated in FIGS. 7A and/or 7B), which cells are diagonal cells, routing non-diagonal cells, and non-routing cells may change based on the configuration of the computational array. As such, all cells may contain a respective routing circuit. In some embodiments, routing circuits of non-routing cells may be powered down or run in a lower power state.

As such, using the techniques described above, the computational array is able to load activation and weight values as well as output result values all from the same first side of the array. By routing all inputs and outputs through the first side of the array, the size of the array may be scaled more easily, and the amount of wiring required may be greatly reduced.

Although FIG. 11 illustrates a routing circuit implemented as part of each cell of the computational array, it is understood that in other embodiments, each sub-cell of each cell may comprise a respective routing circuit for routing result values generated by the sub-cells to be output by the computational array. For example, in some embodiments where each cell comprises a plurality of sub-cells (e.g., an array of sub-cells), each sub-cell may comprise a routing circuit similar to that illustrated in FIG. 11, and where routing of result values is performed at the sub-cell level instead of the cell-level (e.g., based on top and diagonal sub-cells within the array).

Figure 12:
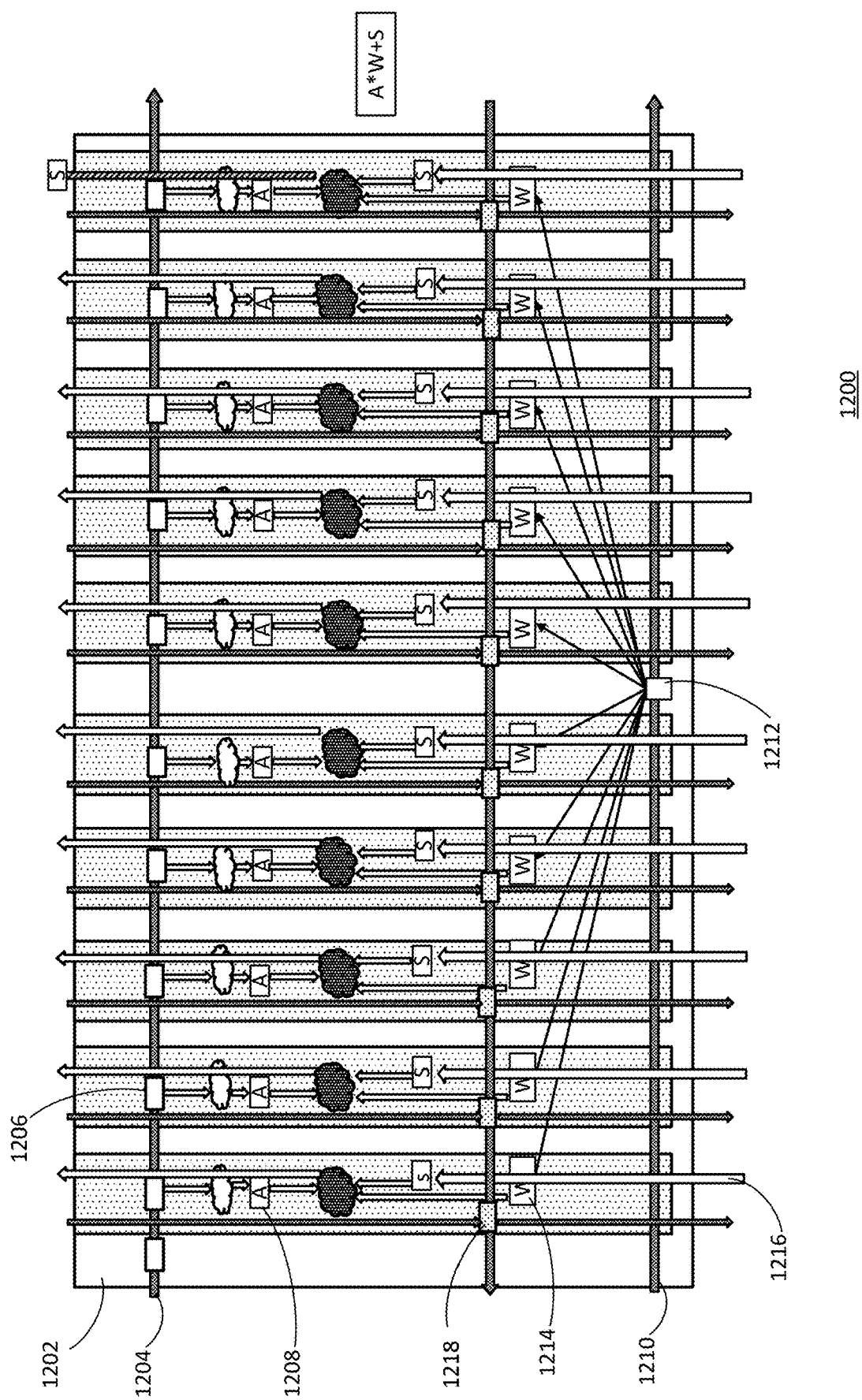
FIG. 12 illustrates an example architecture for loading weights and activations into a computational array, in accordance with some embodiments.

FIG. 12 illustrates an example architecture for loading weights and activations into a computational array, in accordance with some embodiments. FIG. 12 illustrates a row of cells 1202 within a computational array 1200. An activation transmission line 1204 enters a boundary of the computational array via a first side of the array (e.g., left side), and runs across the row of cells. In some embodiments, capture registers 1206 located across the activation transmission line captures the transmitted activation values, allowing them to be loaded onto an activations register 1208 within each cell of the row. In some embodiments, an activation value is propagated to each cell in the row over consecutive clock cycles (e.g., a particular activation value is loaded onto the first cell of the row during a first clock cycle, onto a second cell of the row during a second clock cycle, and so on). In other embodiments, instead of capture registers, other elements or techniques, such as latches or wave pipelining, can be used. In some embodiments, the activation transmission line 1204 may transmit multiple activation values aggregated together, where each cell may extract a particular activation value of the aggregated activation values to be used for computation.

A weights transmission line 1210 enters a boundary of the computational array via a first side of the array (e.g., left side), and runs across the row of cells. A weight distribution register 1212 located along the weights transmission line receives the transmitted weight values, which can be read by the weight registers 1214 of the cells. In some embodiments, each weight register 1214 of the cells is configured to receive a control signal indicating when the weight register is to read the current weight value within the weight distribution register. In other embodiments, the weight distribution register determines which cell is to receive the weight values, based upon the addresses of the processing cells and a received control signal. Because the weight distribution register 1212 is able to distribute the received weights to any cell in the row, weights can be quickly loaded into specific cells, without needing to propagate through the computational array. In some embodiments, the weight distribution register receives a different weight value each cycle, while a write-enable control signal is provided to successive cells of the row, resulting in one cell of the row loading a respective weight value per clock cycle (e.g., a first cell of the row loads a first weight value during a first clock cycle, a second cell of the row loads a second weight value during a second clock cycle, and so forth).

Each cell may process the received weight and activation values (e.g., multiply) to produce a processed value, which is aggregated with a partial sum 1216 received from a below row (if one exists). If the cell is not of a top row of the array, the aggregated partial sum value is propagated to a subsequent cell of an above row. On the other hand, if the cell is of the top row of the array, the aggregation of the processed value and partial sum 1216 forms a results value to be output. In addition, each cell is configured to receive, at a routing circuit 1218 (which may correspond to the routing circuit illustrated in FIG. 11), results data (e.g., a results value) from an above cell and/or a cell to the right, and propagate the results downwards or to the left, based on whether the cell is in a top row of the array or on a diagonal of the row.

In some embodiments, because the cells of each row depend on a result value generated by a previous row (e.g., below row) to determine their own result values, the activation values for the rows of the array may be loaded in a staggered fashion (e.g., each row being one activation value "ahead" of the row above it).

In some embodiments, the cells of the computational array 1200 are configured to begin loading of activation values and calculation of results before all weight values have been loaded in the computational array 1200. For example, as shown in FIG. 12, activation values are propagated across each row 1202 over a plurality of cycles (e.g., via capture registers 1206). Each cell of the row may load an activation value and begin calculating a result once the weight value for the cell is received. For example, because the computational array is able to load a different weight value for a next cell of the row each clock cycle, the computational array can begin propagating a first activation value across the cells of the row once the first cell of the row has loaded a weight value (e.g., during a same clock cycle, one clock cycle after, or other predetermined temporal offset). The loaded weight values may further be used to process subsequently received activation values for each cell of the row. Because the computational array can begin loading activation values and processing results on a particular row once a first cell of row has loaded a weight value, the computational array is able perform calculations using different batches of weights more efficiently, due to not having to wait until all weights of a new batch are loaded before beginning processing of activations. This reduction in delay allows the computational array to handle applications where a given set of weights is only used to process a small number of activations before being updated with new weights.

The use of the routing circuits allows for the final output values of the computational array (e.g., generated at a top cell of each column) to be output from the first side while preserving the relative timing at which the result values are output. For example, in some embodiments, for a computational array with 20 rows, it would take 20 cycles to propagate the results calculated by the cells of a column for a first activation value to a top cell of the column to produce a final result value for the column, and 20 additional cycles to output the result from the first side of the computational array (e.g., 20–i cycles to propagate the final result value of the i-th column of the array downwards to reach the diagonal cell of the column, and i cycles to propagate the value from the diagonal cell to the first side of the array). In addition, the last column of the array determines its results for a given column of activation values m cycles after the first column (where m is the total number of columns in the array), resulting in an additional m cycles between when the results values of the first and last columns for a given column of activation values are output from the array.

In some embodiments where instructions/control signals are propagated across each column of the computational array via the cells of the column over a plurality of cycles (e.g., 1 cell per cell), weight values and activation values are propagated in a staggered fashion (e.g., as illustrated in FIG. 8C) to match a timing of the propagated control signals. While the preceding figures illustrate the each of the weight values and activation values being loaded onto the computational array using certain techniques, in some embodiments, the way in which weights and activation values can be loaded may be reversed (e.g., the weight values loaded along a transmission line having capture registers for each cell, and the activation values loaded along a transmission line read having a distribution register configured to distribute values to multiple cells, or in which each cell is able to read activation values directly from the transmission line), or some combination thereof.

Weight Buffer

Efficient use of the computational array requires that weights be loaded onto the computational array at a rate matching the rate at which weight values can be received by the computational array. For example, using the control signal propagation scheme illustrated in FIG. 6 to load weights into an n×n computational array or subset of a computational array, weights can be loaded into all n×n cells in n clock cycles. By matching the loading of weights with the rate at which the computational array is able to receive the weights, weights can be loaded onto the computational array with no interruptions (e.g., over n cycles).

However, in some embodiments, driving the weights into the computational array at full bandwidth consumes large amounts of precious data bus bandwidth. In order to allow for weights to be loaded quickly, without also interrupting the loading of activation values for performing computations, a weight buffer may be used. In some embodiments, the bandwidth at which weight values are loaded onto the weight buffer is less than the bandwidth at which weight values are able to exit the weight buffer to be loaded onto the computational array. For example, weight values loaded to the weight buffer may be steered to one of a plurality of buffers, each corresponding to one or more rows of the computational array. Weight values may later be loaded from the plurality of buffers in parallel onto different rows of the computational array, allowing for a large number of weight values to be loaded at once.

For instance, as the computational array loads weight and activation values, future weight values to be loaded onto the array may be staged in the weight buffer in preparation for loading onto the computational array over a short timeframe. This "bursty" high bandwidth weight loading allows for good performance for when processing models as it allows for weight values for the model to be loaded without interruption.

As such, in some embodiments, the weight buffer provides a capacitor-like capability to store weight values until they are ready to be loaded onto the computational array. Weight values may be stored in the weight buffer over time, and then rapidly discharged to be loaded onto the computational array. In some embodiments, the weight buffer may also provide a pin-expander function by providing additional local wire bandwidth (e.g., to allow for transmission of multiple weight values across a plurality of cells within a single clock cycle).

In some embodiments, weights stored in the weights buffer pass through a preprocessor that allows for switching of weights to arrange them appropriately within the computational array, reuse of weights to create useful constructs for convolution, and/or preprocessing of numerics.

The use of the weight buffer may thus facilitate efficient use of the computational resources of the computational array by allowing for weight loading into the weight buffer to happen asynchronously and/or over many cycles, while serving as a capacitor-like hardware structure enabling quick loading of stored weight values onto the computational array. This potentially simplifies scheduling, as it allows the controller temporal flexibility to load the weight values over an extended period of time.

While the use of a weight buffer may allow for more efficient weight loading, in some embodiments, it may be desirable to bypass the weight buffer or to dispense with the weight buffer entirely (e.g., to save power and/or to simplify circuit design). For example, in some embodiments, weights are loaded into an n×n array of cells over more than n cycles.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system, comprising:
a computational array comprising a plurality of cells arranged in n rows and m columns, each cell configured to produce a processed value based upon a weight value and an activation value; and
at least two transmission channels corresponding to at least a weights transmission channel and an activations transmission channel;
wherein the weights transmission channel and the activations transmission channel are parallel to each other, and each extend across a first side edge of the computational array to provide weight values and activation values to the cells of the computational array along rows of the n rows of the computational array.

2. The system of claim 1, wherein:
the computational array is configured to generate a plurality of result values based upon processed values produced by each cell, and
wherein the system further comprises a results output channel that extends across the first side edge of the computational array parallel with the at least two transmission channels, and outputs the plurality of results values generated by the computational array.

3. The system of claim 2, wherein the computational array is configured to:
generate, at an end cell of each of the m columns of the computational array, a result value of the plurality of result values, wherein the result value corresponds to an aggregation of processed values generated by the cells of the respective column of the computational array;
output the generated m result values from the first side edge of the computational array via the results output channel.

4. The system of claim 3, wherein the computational array is configured to output the generated m result values from the first side edge of the computational array by, for each result value of the generated m result values:
propagating the result value along a respective column of the m columns by a number of cells until reaching a cell within the respective column that is along a diagonal of the computational array, and
propagating the result value across a respective row of m rows of the computational array from the cell along the diagonal of the computational array, such that each of the result value is output from the computational array from the first side edge of the computational array.

5. The system of claim 4, wherein each of the generated m result values is output from a different row of the n rows of the computational array.

6. The system of claim 2, wherein each cell of the computational array stores an indication of whether the cell is a top cell or a diagonal cell of the computational array, and comprises a routing circuit configured to route a received result value based upon whether the cell is a top cell or a diagonal cell of the computational array.

7. The system of claim 1, further comprising a memory storing a plurality of weight values and a plurality of activation values, wherein the computational array is coupled to the memory via the at least two transmission channels, and wherein the weights transmission channel and the activations transmission channel provide the weight values and activation values to the cells of the computational array from the plurality of weight values and plurality of activation values stored in the memory.

8. The system of claim 1, further comprising a controller circuit configured to transmit a plurality of control signals to the cells of the computational array, wherein the plurality of control signals are propagated along columns of the m columns of the computational array.

9. The system of claim 1, wherein the weights transmission channel comprises, for a row of the computational array, a transmission line and a capture register coupled to a set of cells of the row of the computational array, wherein a cell of the set of cells reads a weight value stored at the capture register in response to the cell receiving a write-enable control signal.

10. The system of claim 9, wherein, during each of a plurality of clock cycles, a different weight value is stored to the capture register to be read and stored by a different cell of the set of cells.

11. The system of claim 1, wherein each cell in a row of the computational array receives a same activation value, and wherein a cell in a particular column of the row of the computational array is configured to receive the activation value via the activations transmission channel during a first clock cycle, and to propagate the received activation value to a cell of the row in a subsequent column of the computational array during a second clock cycle.

12. The system of claim 11, wherein the cells of the row are configured to receive respective weight values via the weights transmission channel over each of a plurality of clock cycles, and wherein the activation value is propagated to each cell of the row a predetermined time period after each cell of the row receives its respective weight value.

13. The system of claim 1, where n equals m.

14. The system of claim 1, wherein each cell of the computational array comprises an array of sub-cells.

15. The system of claim 1, wherein the weight values comprise a plurality of weight vectors.

16. A method, comprising:
    transmitting, over at least two transmission channels corresponding to at least a weights transmission channel and an activations transmission channel, a plurality of weight values and a plurality of activation values, wherein the weights transmission channel and the activations transmission channel are parallel to each other;
    receiving, at a computational array comprising a plurality of cells arranged in n rows and m columns, the plurality of weight values and the plurality of activation values from the weights transmission channel and the activations transmission channel, wherein the weights transmission channel and the activations transmission channel each extend across a first side edge of the computational array to provide a-weight values of the plurality of weight values and activation values of the plurality of activation values to each cell of the computational array along rows of the n rows of the computational array; and
    producing, at each cell of the computational array, a processed value based upon a received weight value and a received activation value.

17. The method of claim 16, further comprising:
    generating, at the computational array, a plurality of result values based upon processed values produced by each cell, and
    outputting the plurality of result values generated by the computational array via a results output channel that extends across the first side edge of the computational array.

18. The method of claim 17, wherein generating, at the computational array, a plurality of result values based upon processed values produced by each cell comprises:
    generating, at an end cell of each of the m columns of the computational array, a result value of the plurality of result values, the result value corresponding to an aggregation of processed values generated by the cells of the respective column of the computational array; and
    outputting the generated m result values from the first side edge of the computational array via the results output channel.

19. The method of claim 18, wherein outputting the generated m result values from the first side edge of the computational array via the results output channel comprises:
    propagating each of the generated m result values along the respective column by a number of cells until reaching a cell within the respective column that is along a diagonal of the computational array, and
    propagating each of the generated m result values across a respective row of m rows of the computational array from the respective cell along the diagonal of the computational array, such that each of the generated m result values are output from the computational array from the first side edge of the computational array.

20. The method of claim 18, wherein each of the generated m result values is output from a different row of the n rows of the computational array.

* * * * *

UNITED STATES PATENT AND TRADEMARK OFFICE
CERTIFICATE OF CORRECTION

PATENT NO. : 11,392,535 B2
APPLICATION NO. : 17/104465
DATED : July 19, 2022
INVENTOR(S) : Ross et al.

Page 1 of 1

It is certified that error appears in the above-identified patent and that said Letters Patent is hereby corrected as shown below:

In the Claims

In Column 24, in Claim 2, Line 9, delete "results" and insert -- result --, therefor.

In Column 25, in Claim 16, Line 34, delete "a-weight" and insert -- weight --, therefor.

Signed and Sealed this
Sixth Day of December, 2022

Katherine Kelly Vidal
*Director of the United States Patent and Trademark Office*